US012169783B2

(12) United States Patent
Ye et al.

(10) Patent No.: US 12,169,783 B2
(45) Date of Patent: Dec. 17, 2024

(54) PEDESTRIAN DETECTION METHOD AND APPARATUS, COMPUTER-READABLE STORAGE MEDIUM, AND CHIP

(71) Applicant: HUAWEI TECHNOLOGIES CO., LTD., Guangdong (CN)

(72) Inventors: Qixiang Ye, Beijing (CN); Tianliang Zhang, Shenzhen (CN); Jianzhuang Liu, Shenzhen (CN); Xiaopeng Zhang, Shanghai (CN); Qi Tian, Shenzhen (CN); Lihui Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 395 days.

(21) Appl. No.: 17/586,136

(22) Filed: Jan. 27, 2022

(65) Prior Publication Data

US 2022/0148328 A1    May 12, 2022

Related U.S. Application Data

(63) Continuation of application No. PCT/CN2020/105020, filed on Jul. 28, 2020.

(30) Foreign Application Priority Data

Jul. 30, 2019   (CN) .......................... 201910697411.3

(51) Int. Cl.
*G06N 3/084*     (2023.01)
*G06F 18/25*     (2023.01)
(Continued)

(52) U.S. Cl.
CPC .......... *G06N 3/084* (2013.01); *G06F 18/253* (2023.01); *G06N 3/045* (2023.01); *G06V 10/255* (2022.01);
(Continued)

(58) Field of Classification Search
CPC .... G06N 3/084; G06N 3/045; G06V 10/7715; G06V 10/806; G06V 10/809;
(Continued)

(56) References Cited

U.S. PATENT DOCUMENTS 9,443,320 B1      9/2016 Gaidon et al.
2017/0206426 A1*  7/2017 Schrier .................. G06V 10/82

FOREIGN PATENT DOCUMENTS

CN       107578021 A      1/2018
CN       107944369 A  *   4/2018   ......... G06K 9/00362
(Continued)

OTHER PUBLICATIONS

Dong, P. and Wang, W., "Better region proposals for pedestrian detection with R-CNN," 2016 Visual Communications and Image Processing (VCIP), Chengdu, China, 2016, pp. 1-4, doi: 10.1109/VCIP.2016.7805452. (Year: 2016).*
(Continued)

*Primary Examiner* — Amandeep Saini
*Assistant Examiner* — Daniella M. DiGuglielmo
(74) *Attorney, Agent, or Firm* — Fish & Richardson P.C.

(57) ABSTRACT

This application relates to the field of artificial intelligence and the field of computer vision. The method includes performing feature extraction on an image to obtain a basic feature map of the image, and determining a proposal of a region possibly including a pedestrian in the image. The basic feature map of the image is then processed to obtain an object visibility map in which a response to a pedestrian visible part is greater than a response to a pedestrian blocked part and a background part. The method further performs weighted summation processing on the object visibility map and the basic feature map to obtain an enhanced feature map of the image, and determines, based on the proposal of the image and the enhanced feature map of the image, a bound-
(Continued)

ing box including a pedestrian in the image and a confidence level of the bounding box including the pedestrian.

20 Claims, 23 Drawing Sheets

(51) Int. Cl.
G06N 3/045 (2023.01)
G06V 10/20 (2022.01)
G06V 10/77 (2022.01)
G06V 10/80 (2022.01)
G06V 10/82 (2022.01)
G06V 20/40 (2022.01)
G06V 20/52 (2022.01)
G06V 20/58 (2022.01)
G06V 40/10 (2022.01)

(52) U.S. Cl.
CPC ........ *G06V 10/7715* (2022.01); *G06V 10/806* (2022.01); *G06V 10/809* (2022.01); *G06V 10/82* (2022.01); *G06V 20/40* (2022.01); *G06V 20/52* (2022.01); *G06V 20/58* (2022.01); *G06V 40/10* (2022.01)

(58) Field of Classification Search
CPC ........ G06V 10/82; G06V 20/52; G06V 20/58; G06V 40/10; G06V 10/255; G06V 20/40; G06F 18/253
See application file for complete search history.

(56) References Cited

FOREIGN PATENT DOCUMENTS

| CN | 108038409 A | 5/2018 |
|----|-------------|--------|
| CN | 108664838 A | 10/2018 |
| JP | 2013186902 A | 9/2013 |
| JP | 2016219004 A | 12/2016 |
| JP | 2018147431 A | 9/2018 |
| JP | 2018534694 A | 11/2018 |
| JP | 2019036009 A | 3/2019 |
| JP | 2019075116 A | 5/2019 |
| WO | 2015184764 A1 | 12/2015 |
| WO | 2018215861 A1 | 11/2018 |
| WO | 2019043988 A1 | 3/2019 |

OTHER PUBLICATIONS

Li et al., "Scale-aware Fast R-CNN for Pedestrian Detection," arXiv, 2016, pp. 1-10. (Year: 2016).*
Office Action in Japanese Appln. No. 2022-506071, mailed on Mar. 7, 2023, 6 pages (with English translation).
Extended European Search Report issued in European Application No. 20848616.7 on Sep. 2, 2022, 6 pages.
PCT International Search Report and Written Opinion issued in International Application No. PCT/CN2020/105020 on Oct. 16, 2020, 17 pages (with English translation).
Ren et al., "Faster R-CNN: Towards Real-Time Object Detection with Region Proposal Networks," Advances in Neural Information Processing Systems, vol. 28, Dec. 2015, 9 pages.
Zhang, "Occlusion-Aware R-CNN: Detecting Pedestrians in a Crowd," European Conference on Computer Vision (ECCV), Sep. 2018, 17 pages.
Zhang et al., "Citypersons: A Diverse Dataset for Pedestrian Detection," 2017 IEEE Conference on Computer Vision and Pattern Recognition (CVPR), Jul. 2017, 12 pages.
Zhou et al., "SSA-CNN: Semantic Self-Attention CNN for Pedestrian Detection," CoRR, submitted on Jun. 6, 2019, arXiv:1902.09080v3, 10 pages.
EP Communication Pursuant to Article 94(3) EPC in European Appln No. 20848616.7, dated Aug. 12, 2024, 6 pages.

* cited by examiner

PEDESTRIAN DETECTION METHOD AND APPARATUS, COMPUTER-READABLE STORAGE MEDIUM, AND CHIP

CROSS-REFERENCE TO RELATED APPLICATIONS

This application is a continuation of International Application No. PCT/CN2020/105020, filed on Jul. 28, 2020, which claims priority to Chinese Patent Application No. 201910697411.3, filed on Jul. 30, 2019. The disclosures of the aforementioned applications are hereby incorporated by reference in their entireties.

TECHNICAL FIELD

This application relates to the computer vision field in the artificial intelligence field, and more specifically, to a pedestrian detection method and apparatus, a computer-readable storage medium, and a chip.

BACKGROUND

As an inseparable part of various intelligent/autonomous systems in various application fields, for example, fields such as manufacturing, testing, document analysis, medical diagnosis, and military, computer vision is a learning about how to use a camera/video camera and a computer to obtain required data and information about a photographed object. Vividly, the computer is equipped with an eye (the camera/video camera) and a brain (an algorithm) to replace human eyes to recognize, track, and measure a target, so that the computer can sense an environment. Because the "sense" may be considered as extracting information from a sensory signal, computer vision may also be considered as a science of studying how to make an artificial system "sense" an image or multi-dimensional data. In general, computer vision is obtaining input information by various imaging systems instead of a visual organ, and then processing and interpreting the input information by a computer instead of a brain. An ultimate research goal of computer vision is to enable a computer to observe and understand the world like a human being, and be able to adapt to an environment.

In the computer vision field, pedestrian detection is a very important research direction. Pedestrian detection has important applications in many fields and scenarios. For example, in an advanced driver assistance system (advanced driving assistant system, ADAS) and an automated driving system (autonomous driving system, ADS), a dynamic obstacle such as a pedestrian on a road is detected and evaded. In Safe City and video surveillance, a pedestrian is detected to find a criminal suspect or track a missing person. In a smart home system, a pedestrian is detected for a robot to move and evade an obstacle.

In a conventional solution, during pedestrian detection, a detection effect when a pedestrian is blocked is poor, which is mainly reflected in missing detection and incorrect detection of the blocked pedestrian.

SUMMARY

This application provides a pedestrian detection method and apparatus, a computer-readable storage medium, and a chip, to improve accuracy of pedestrian (especially a blocked pedestrian) detection.

According to a first aspect, a pedestrian detection method is provided. The method includes: obtaining an image; performing feature extraction on the image to obtain a basic feature map of the image; determining, based on the basic feature map, a proposal possibly including a pedestrian in the image; processing the basic feature map of the image to obtain an object visibility map of the image; performing fusion processing on the basic feature map of the image and the object visibility map of the image to obtain an enhanced feature map of the image; determining, based on the proposal of the image and the enhanced feature map of the image, a feature corresponding to the proposal; and determining, based on the feature corresponding to the proposal, a bounding box (bounding box) including a pedestrian in the image and a confidence level of the bounding box including the pedestrian in the image.

The image may be an image including a pedestrian.

Optionally, the obtaining an image includes: performing photographing by using a camera to obtain the image.

For example, for a mobile phone, the image may be obtained through photographing.

Optionally, the obtaining an image includes: obtaining the image from a memory.

For example, for a mobile phone, the image may be selected from an album.

When the basic feature map of the image is obtained, the basic feature map may be specifically obtained by performing a convolution operation (convolution processing) on the image, or performing further processing (for example, an operation such as summation, weighting processing, or concatenation) on a result of the convolution operation on the image.

The proposal is a bounding box of a region possibly including a pedestrian in the image. A region in which the proposal is located may be a region bounded by the proposal (a region inside the proposal). The region in which the proposal is located is a region possibly including a pedestrian in the image.

The object visibility map of the image has different response degrees to different objects. In the object visibility map of the image, a response degree to a pedestrian visible part is greater than a response degree to a pedestrian invisible part. In other words, in the object visibility map of the image, a feature of the pedestrian visible part is highlighted relative to a feature of the pedestrian invisible part. Specifically, in the object visibility map of the image, a pixel value of the pedestrian visible part is greater than a pixel value of the pedestrian invisible part.

With the object visibility map of the image, the feature of the pedestrian visible part can be highlighted.

In addition, in the object visibility map of the image, the pedestrian visible part is a part in which a pedestrian image can be seen, and the pedestrian invisible part is a part in which no pedestrian image can be seen.

The feature corresponding to the proposal may include a region feature of the proposal. The region feature of the proposal is a feature of a region that is in the enhanced feature map and that is located in the proposal. Specifically, the region feature of the proposal may be a feature that is in the enhanced feature map and that is located of the region bounded by the proposal.

The region feature of the proposal may be a feature in a region that is in the enhanced feature map and that corresponds to the proposal. When the region feature of the proposal is determined, a location of the proposal in the enhanced feature map may be first determined, and then, a feature in a region that is in the enhanced feature map and that is bounded by the proposal may be determined as the region feature of the proposal.

Further, sampling processing (which may be specifically upsampling or downsampling) may be further performed on the feature of the region that is in the enhanced feature map and that is bounded by the proposal, to obtain the region feature of the proposal.

The bounding box including the pedestrian in the image and the confidence level of the bounding box including the pedestrian in the image may be a detection result of pedestrian detection performed on the image, and may be referred to as a pedestrian detection result of the image.

In this application, because the object visibility map of the image can highlight the feature of the pedestrian visible part, the enhanced feature map obtained by fusing the basic feature map of the image and the object visibility map of the image highlights the feature of the pedestrian visible part, thereby improving accuracy of pedestrian detection subsequently performed based on the enhanced feature map. In addition, when a pedestrian is blocked (relatively severely), accuracy of pedestrian detection in this application is relatively significantly improved.

Further, in this application, when accuracy of pedestrian detection is improved by using the object visibility map, a marking amount of training data is not increased in a training process. In this application, there are only needs to generate the object visibility map in a processing process and comprehensively consider the object visibility map in subsequent processing. Compared with a solution in which accuracy of pedestrian detection is improved by increasing a data marking amount, this application can reduce a data marking amount and reduce training complexity.

Optionally, in the object visibility map of the image, the pedestrian invisible part includes a pedestrian blocked part.

When the pedestrian invisible part includes the pedestrian blocked part, the pedestrian visible part and the pedestrian blocked part can be distinguished in the object visibility map. In addition, because the pixel value of the pedestrian visible part is greater than a pixel value of the pedestrian blocked part, in the object visibility map, the feature of the pedestrian visible part can be highlighted, and a feature of the pedestrian blocked part can be weakened, to reduce impact of the pedestrian blocked part on a detection result in a subsequent pedestrian detection process, so that the feature of the pedestrian visible part is highlighted during subsequent pedestrian detection, thereby improving an effect of pedestrian detection.

Optionally, in the object visibility map of the image, the pedestrian invisible part includes a background part of the image.

The background part of the image may be another part other than a pedestrian in the image, or the background part of the image may be another part other than a pedestrian and a main object (for example, a car) in the image.

When the pedestrian invisible part includes the background part of the image, the pedestrian and the background part can be distinguished in the object visibility map, to highlight the feature of the pedestrian visible part, and weaken a feature of the background part, to reduce impact of the background part on a detection result in a subsequent pedestrian detection process, so that the feature of the pedestrian visible part is highlighted during subsequent pedestrian detection, thereby improving an effect of pedestrian detection.

With reference to the first aspect, in some implementations of the first aspect, the processing the basic feature map of the image to obtain an object visibility map of the image includes: performing convolution processing on the basic feature map of the image by using a first convolutional network, to obtain a plurality of first semantic feature maps; and performing weighted summation processing on the plurality of first semantic feature maps to obtain the object visibility map of the image; and the determining, based on the feature corresponding to the proposal, a bounding box including a pedestrian in the image and a confidence level of the bounding box including the pedestrian in the image includes: performing, by using a second convolutional network, convolution processing on the feature corresponding to the proposal, to obtain a plurality of second semantic feature maps; processing the plurality of second semantic feature maps by using a regressor, to determine a location of the bounding box; and processing the plurality of second semantic features by using a classifier, to obtain the confidence level of the bounding box including the pedestrian in the image.

The plurality of first semantic feature maps are a plurality of feature maps that have different semantic meanings and that are extracted from a full map of the basic feature map. Specifically, any two of the plurality of first semantic feature maps correspond to different semantic meanings.

The plurality of second semantic feature maps represent, respectively, a plurality of feature maps that have different semantic meanings and that are extracted from the feature corresponding to the proposal. A convolution parameter of the second convolutional network is the same as a convolution parameter of the first convolutional network. Specifically, any two of the plurality of second semantic feature maps correspond to different semantic meanings.

That the convolution parameters of the first convolutional network and the second convolutional network are the same may mean that convolution kernel parameters of the first convolutional network and the second convolutional network are the same. Further, that the convolution parameters of the first convolutional network and the second convolutional network are the same may alternatively mean that network architectures and convolution kernel parameters of the first convolutional network and the second convolutional network are completely the same, and when the first convolutional network and the second convolutional network are used to perform feature extraction on a same image, same semantic features of the image can be extracted.

A weighting coefficient used when the weighted summation processing is performed on the plurality of first semantic features is a weight coefficient that is in the classifier and that is used to determine a confidence level.

In this application, because the convolution parameters of the first convolutional network and the second convolutional network are the same, and the weighting coefficient used when weighted summation processing is performed on the plurality of first semantic features is the weight coefficient that is in the classifier and that is used to determine a pedestrian score, the object visibility map that can highlight the pedestrian visible part can be obtained by processing the plurality of first semantic features, so that pedestrian detection can be more accurately performed subsequently based on the object visibility map.

With reference to the first aspect, in some implementations of the first aspect, the feature corresponding to the proposal further includes a region feature of a contour region of the proposal, and the contour region of the proposal is a region formed between the proposal and a scaled-down proposal obtained after the proposal is scaled down by a first preset proportion.

That the proposal is scaled down by a first preset proportion may specifically mean that a width and a height of the proposal are respectively scaled down by specific proportions, and the proportions at which the width and the height of the proposal are scaled down may be the same or may be different.

Optionally, that the proposal is scaled down by a first preset proportion includes: the width of the proposal is scaled down by a first scale-down proportion, and the height of the proposal is scaled down by a second scale-down proportion.

The first preset proportion includes the first scale-down proportion and the second scale-down proportion, and the first scale-down proportion and the second scale-down proportion may be the same or may be different.

The first scale-down proportion and the second scale-down proportion may be set based on experience. For example, proper values may be set for the first scale-down proportion and the second scale-down proportion, so that a contour feature of a pedestrian can be better extracted from the contour region that is of the proposal and that is obtained after the width and the height of the proposal are scaled down by the first scale-down proportion and the second scale-down proportion.

The first scale-down proportion and the second scale-down proportion may be set to values that can be used to better extract a pedestrian contour.

The first scale-down proportion may be 1/1.1, and the second scale-down proportion may be 1/1.8.

The region feature of the contour region of the proposal generally includes a contour feature of a pedestrian, and the contour feature of the pedestrian plays a very important role in pedestrian detection.

In this application, when the feature corresponding to the proposal further includes the region feature of the contour region of the proposal, the contour feature of the pedestrian can also be considered during pedestrian detection, so that pedestrian detection can be better performed subsequently in combination with the contour feature of the pedestrian.

With reference to the first aspect, in some implementations of the first aspect, the method further includes: setting a value of a feature that is of the region feature of the proposal and that is located in the scaled-down proposal to zero, to obtain the region feature of the contour region of the proposal.

In this application, when the region feature of the contour region of the proposal is obtained, the value of the feature that is of the region feature of the proposal and that is located in the scaled-down proposal is directly set to zero, so that the region feature of the contour region of the proposal can be quickly and conveniently obtained.

It should be understood that in this application, the region feature of the contour region of the proposal may alternatively be obtained in another manner. For example, the region feature of the contour region of the proposal may be directly obtained from the enhanced feature map through scanning based on a region location of the contour region of the proposal.

With reference to the first aspect, in some implementations of the first aspect, the feature corresponding to the proposal further includes a region feature of a background region of the proposal, and the background region of the proposal is a region formed between the proposal and a scaled-up proposal obtained after the proposal is scaled up by a second preset proportion.

That the proposal is scaled up by a second preset proportion may specifically mean that the width and the height of the proposal are respectively scaled up by specific proportions, and the proportions at which the width and the height of the proposal are scaled up may be the same or may be different.

Optionally, that the proposal is scaled up by a second preset proportion includes: the width of the proposal is scaled up by a first scale-up proportion, and the height of the proposal is scaled up by a second scale-up proportion.

The second preset proportion includes the first scale-up proportion and the second scale-up proportion, and the first scale-up proportion and the second scale-up proportion may be the same or may be different.

The first scale-up proportion and the second scale-up proportion may be set based on experience. For example, proper values may be set for the first scale-up proportion and the second scale-up proportion, so that a background feature around a pedestrian can be better extracted from the background region that is of the proposal and that is obtained after the width and the height of the proposal are scaled up by the first scale-up proportion and the second scale-up proportion.

The first scale-up proportion may be 1.1, and the second scale-up proportion may be 1.8.

The region feature of the background region of the proposal generally reflects a feature of a background region in which a pedestrian in the image is located. Pedestrian detection may be performed based on the feature of the background region and a feature of the pedestrian.

In this application, when the feature corresponding to the proposal further includes the region feature of the background region of the proposal, the region feature of the background region can also be considered during pedestrian detection, so that pedestrian detection can be better performed subsequently in combination with the region feature of the background region.

With reference to the first aspect, in some implementations of the first aspect, the method further includes: obtaining a region feature of a first region, where the region feature of the first region is a region feature in a region that is in the object visibility map and that is located in the scaled-up proposal; and setting a feature that is of the region feature of the first region and that is located in the proposal to zero, to obtain the region feature of the background region of the proposal.

In this application, when the region feature of the background region of the proposal is obtained, a region feature that is in the enhanced feature map and that corresponds to the background region of the proposal is obtained, and then a feature that is of the region feature and that is located in the proposal is directly set to zero, so that the region feature of the background region of the proposal can be quickly and conveniently obtained.

Optionally, the method is performed by a neural network (model).

Specifically, in the method, after the image is obtained, the image may be processed by using the neural network (model). Finally, the bounding box including the pedestrian in the image and the confidence level of the bounding box including the pedestrian in the image are determined based on the feature corresponding to the proposal.

According to a second aspect, a neural network training method is provided. The method includes: obtaining training data, where the training data includes a training image and a pedestrian marking result of the training image; performing the following processing on the training image based on a neural network: performing convolution processing on the training image to obtain a basic feature map of the training image; determining, based on the basic feature map, a proposal possibly including a pedestrian in the training image; processing the basic feature map of the training image to obtain an object visibility map of the training image; performing fusion processing on the basic feature map of the training image and the object visibility map of the training image to obtain an enhanced feature map of the training image; determining, based on the proposal of the training image and the enhanced feature map of the training image, a feature corresponding to the proposal; and determining a pedestrian detection result of the training image based on the feature corresponding to the proposal; and determining a loss value of the neural network based on the pedestrian detection result of the training image and the pedestrian marking result of the training image, and then adjusting the neural network based on the loss value through back propagation.

The proposal is a bounding box of a region possibly including a pedestrian in the training image. A region in which the proposal is located may be a region bounded by the proposal (a region inside the proposal). The region in which the proposal is located is a region possibly including a pedestrian in the training image.

In addition, in the object visibility map of the training image, the pedestrian visible part is a part in which a pedestrian image can be seen, and the pedestrian invisible part is a part in which no pedestrian image can be seen.

The feature corresponding to the proposal may include a region feature of the proposal. The region feature of the proposal is a feature of a region that is in the enhanced feature map and that is located in the proposal.

The pedestrian detection result of the training image may include a bounding box including a pedestrian in the training image and a confidence level of the bounding box including the pedestrian in the image.

The pedestrian detection marking result of the training image includes a bounding box including a pedestrian in the training image.

The pedestrian detection marking result of the training image may be marked (which specifically may be manually marked) in advance.

In addition, in the foregoing training process, a plurality of training images are generally used.

In the process of training the neural network, an initial set of model parameters may be set for the neural network, then the model parameters of the neural network are gradually adjusted based on a difference between the pedestrian detection marking result of the training image and the pedestrian detection result of the training image, until the difference between the pedestrian detection result of the training image and the pedestrian detection marking result of the training image falls within a preset range or a quantity of times of training reaches a preset quantity of times, and the model parameters of the neural network in this case are determined as final model parameters of the neural network. In this way, training of the neural network is completed.

It should be understood that the neural network obtained through training by using the method in the second aspect can be used to perform the method in the first aspect of this application.

It should be understood that in this application, the basic feature map, the proposal, the object visibility map, the enhanced feature map, the bounding box including the pedestrian in the image, and the confidence level of the bounding box including the pedestrian in the image that appear when the pedestrian detection method in the embodiments of this application is described or explained are described with respect to the obtained image, while in the neural network training method in the embodiments of this application, the basic feature map, the proposal, the object visibility map, the enhanced feature map, the bounding box including the pedestrian in the image, and the confidence level of the bounding box including the pedestrian in the image are described with respect to the training image.

According to a third aspect, a pedestrian detection apparatus is provided. The pedestrian detection apparatus includes modules configured to perform the method in the first aspect.

According to a fourth aspect, a neural network training apparatus is provided. The apparatus includes modules configured to perform the method in the second aspect.

According to a fifth aspect, a pedestrian detection apparatus is provided. The apparatus includes: a memory, configured to store a program; and a processor, configured to execute the program stored in the memory. When the program stored in the memory is executed, the processor is configured to perform the method in the first aspect.

According to a sixth aspect, a neural network training apparatus is provided. The apparatus includes: a memory, configured to store a program; and a processor, configured to execute the program stored in the memory. When the program stored in the memory is executed, the processor is configured to perform the method in the second aspect.

According to a seventh aspect, an electronic device is provided. The electronic device includes the pedestrian detection apparatus in the third aspect or the fifth aspect.

According to an eighth aspect, an electronic device is provided. The electronic device includes the neural network training apparatus in the fourth aspect or the sixth aspect.

The electronic device may be specifically a mobile terminal (for example, a smartphone), a tablet computer, a notebook computer, an augmented reality/virtual reality device, an in-vehicle terminal device, or the like.

According to a ninth aspect, a computer-readable storage medium is provided. The computer-readable storage medium stores program code, and the program code includes an instruction used to perform steps in the method in the first aspect or the second aspect.

According to a tenth aspect, a computer program product including an instruction is provided. When the computer program product is run on a computer, the computer is enabled to perform the method in the first aspect or the second aspect.

According to an eleventh aspect, a chip is provided. The chip includes a processor and a data interface, and the processor reads, through the data interface, an instruction stored in a memory, to perform the method in the first aspect or the second aspect.

Optionally, in an implementation, the chip may further include the memory, the memory stores the instruction, the processor is configured to execute the instruction stored in the memory, and when the instruction is executed, the processor is configured to perform the method in the first aspect.

The chip may be specifically a field programmable gate array FPGA or an application-specific integrated circuit ASIC.

It should be understood that in this application, the method in the first aspect may be specifically the method in any one of the first aspect or the implementations of the first aspect. The method in the second aspect may be specifically the method in any one of the second aspect or the implementations of the second aspect.

DESCRIPTION OF EMBODIMENTS

Solutions of this application may be applied to fields requiring pedestrian recognition (which may also be referred to as pedestrian detection), such as driver assistance, automated driving, Safe City, and intelligent terminals. The following briefly describes two common application scenarios.

Application Scenario 1: Driver Assistance/Automated Driving System

In the advanced driver assistance system (advanced driving assistant system, ADAS) and the automated driving system (autonomous driving system, ADS), a dynamic obstacle such as a pedestrian on a road need to be detected and evaded, and in particular, collision with the pedestrian needs to be avoided. There are often dense pedestrians on a traffic road, and blocking between pedestrians or between a pedestrian and another object is relatively severe, causing a severe threat to driving safety. Therefore, accurate pedestrian detection in a scenario with severe blocking is of great significance to driving safety.

Figure 1:
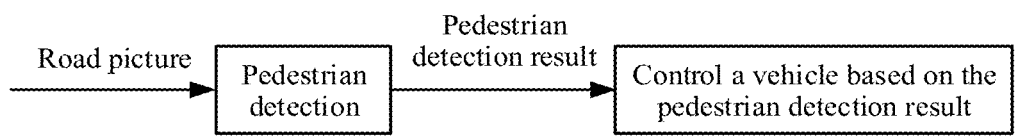
FIG. 1 is a schematic diagram of a pedestrian detection process in a driver assistance/automated driving system according to an embodiment of this application.

Specifically, as shown in FIG. 1, a pedestrian detection result is obtained after pedestrian detection is performed on a road picture obtained by the driver assistance/automated driving system. Then, the driver assistance/automated driving system may control a vehicle based on the pedestrian detection result.

The pedestrian detection may be performed by using a pedestrian detection method in an embodiment of this application. Whether there is a pedestrian in the road picture and a location of the pedestrian can be determined based on the pedestrian detection, so that the driver assistance/automated driving system controls the vehicle based on a recognition result.

Application Scenario 2: Safe City/Video Surveillance System

In the Safe City system and the video surveillance system, pedestrian detection is performed in real time, a pedestrian detection result is marked, and the pedestrian detection result is sent to an analysis unit of the system to search for a criminal suspect and a missing person to implement skynet tracking.

Figure 2:
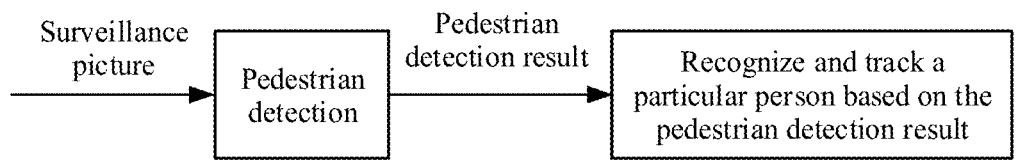
FIG. 2 is a schematic diagram of a pedestrian detection process in a Safe City/video surveillance system according to an embodiment of this application.

Specifically, as shown in FIG. 2, a pedestrian detection result is obtained after pedestrian detection is performed on a road picture obtained by the Safe City/video surveillance system. Then, a particular person may be recognized and tracked based on the pedestrian detection result.

The pedestrian detection may be performed by using a pedestrian detection method in an embodiment of this application. Whether there is a pedestrian in the surveillance picture and a location of the pedestrian can be determined based on the pedestrian detection. When there is a pedestrian in the surveillance picture, whether the pedestrian is a particular person (a missing person, a criminal suspect, or the like) may be recognized. When the particular person is recognized, a Sky Eye system (which may be considered as a part of the Safe City/video surveillance system) may be started to track the particular person.

The pedestrian detection method in the embodiments of this application may be performed by a neural network (model). To better understand the pedestrian detection method in the embodiments of this application, the following first describes related terms and concepts of the neural network.

(1) Neural Network

The neural network may include a neuron. The neuron may be an operation unit that uses $x_s$ and an intercept 1 as inputs. An output of the operation unit may be shown in formula (1):

$$h_{W,b}(x) = f(W^T x) = f\left(\sum_{s=1}^{n} W_s x_s + b\right) \quad (1)$$

s=1, 2, ..., n, n is a natural number greater than 1, $W_s$ is a weight of $x_s$, and b is a bias of the neuron. f is an activation function (activation functions) of the neuron. The activation function is used to perform non-linear transformation on a feature in the neural network, to convert an input signal in the neuron into an output signal. The output signal of the activation function may be used as an input of a next convolutional layer. The activation function may be a sigmoid function. The neural network is a network formed by connecting a plurality of single neurons. In other words, an output of one neuron may be an input of another neuron. An input of each neuron may be connected to a local acceptance domain of a previous layer, to extract a feature of the local acceptance domain. The local acceptance domain may be a region including a plurality of neurons.

(2) Deep Neural Network

The deep neural network (deep neural network, DNN) is also referred to as a multi-layer neural network, and may be understood as a neural network having a plurality of hidden layers. The DNN is divided based on locations of different layers. A neural network in the DNN may be divided into three types: an input layer, a hidden layer, and an output layer. Generally, the first layer is an input layer, the last layer is an output layer, and a layer in the middle is a hidden layer. Layers are fully connected. To be specific, any neuron in an $i^{th}$ layer is definitely connected to any neuron in an $(i+1)^{th}$ layer.

Although the DNN seems complex, work of each layer is actually not complex. Simply, the following linear relationship expression is used: $\vec{y}=\alpha(W \cdot \vec{x}+\vec{b})$. $\vec{x}$ is an input vector, $\vec{y}$ is an output vector, $\vec{b}$ is a bias vector, W is a weight matrix (also referred to as a coefficient), and $\alpha()$ is an activation function. Each layer simply performs such a simple operation on an input vector $\vec{x}$ to obtain an output vector $\vec{y}$. Because the DNN has a large quantity of layers, there are also relatively large quantities of coefficients W and bias vectors $\vec{b}$. These parameters are defined in the DNN as follows: Using the coefficient W as an example, assuming that the coefficient is in a three-layer DNN, a linear coefficient from a fourth neuron in a second layer to a second neuron in a third layer is defined as $W_{24}^3$. The superscript 3 represents a number of a layer in which the coefficient W is located, and the subscript corresponds to an index 2 of an output in the third layer and an index 4 of an input in the second layer.

In conclusion, a coefficient from a $k^{th}$ neuron in an $(L-1)^{th}$ layer to a $j^{th}$ neuron at an $L^{th}$ layer is defined as $W_{jk}^L$.

It should be noted that an input layer does not have the parameter W. In the deep neural network, more hidden layers enable the network to describe a more complex situation in the real world. Theoretically, a model with more parameters is more complex, and has a larger "capacity", which means that the model can complete a more complex learning task. A process of training the deep neural network is a process of learning a weight matrix, whose ultimate goal is to obtain a weight matrix for all layers of a trained deep neural network (a weight matrix including vectors W of many layers).

(3) Convolutional Neural Network

The convolutional neural network (convolutional neural network, CNN) is a deep neural network with a convolutional structure. The convolutional neural network includes a feature extractor including a convolutional layer and a sub-sampling layer. The feature extractor may be considered as a filter. The convolutional layer is a neuron layer that is in the convolutional neural network and that performs convolution processing on an input signal. In the convolutional layer of the convolutional neural network, a neuron may be connected to only some neurons in an adjacent layer. One convolutional layer usually includes a plurality of feature planes. Each feature plane may include some neurons arranged in a rectangle. Neurons in a same feature plane share a weight. The shared weight herein is a weight coefficient of a convolution kernel. The shared weight may be understood as that a manner of extracting image information is unrelated to a location. The convolution kernel may be initialized in a form of a matrix of a random size. In a process of training the convolutional neural network, the convolution kernel may obtain a proper weight through learning. In addition, a direct benefit brought by the shared weight is reducing connections between layers of the convolutional neural network, and reducing a risk of overfitting.

(4) Residual Network

The residual network is a deep convolutional network proposed in 2015. Compared with a conventional neural network, it is easier to optimize the residual network, and accuracy can be improved by increasing a depth properly. A core of the residual network is to resolve a side effect (a degeneration problem) caused by a depth increase. In this way, network performance can be improved by simply increasing a network depth. The residual network generally includes many sub-modules with a same structure. For example, ResNet50 indicates that the residual network includes 50 sub-modules.

(6) Classifier

Many neural network structures end up with a classifier, configured to classify objects in an image. The classifier generally includes a fully connected layer (fully connected layer) and a softmax function (which may be referred to as a normalized exponential function), and can output probabilities of different categories based on an input.

(7) Loss Function

In a process of training a deep neural network, because it is expected that an output of the deep neural network is as close as possible to a value that is actually expected to be predicted, a predicted value of a current network and a target value that is actually expected may be compared, and then, a weight vector of each layer of neural network is updated based on a difference between the two (certainly, there is usually an initialization process before the first update, that is, a parameter is preconfigured for each layer in the deep neural network). For example, if the predicted value of the network is higher, the weight vector is adjusted to obtain a lower predicted value. The weight vector is continuously adjusted until the deep neural network can predict the target value that is actually expected or a value that is very close to the target value that is actually expected. Therefore, how to compare the predicted value with the target value to obtain the difference needs to be predefined. This leads to a loss function or an objective function, which is an important equation used to measure the difference between the predicted value and the target value. Using the loss function as an example, a higher output value (loss) of the loss function indicates a larger difference. Therefore, training of the deep neural network becomes a process of reducing the loss as much as possible.

(8) Back Propagation Algorithm

For a neural network, an error back propagation (back propagation, BP) algorithm may be used to correct a value of a parameter in an initial neural network model in a training process, so that a reconstruction error loss of the neural network model becomes smaller. Specifically, an input signal is transferred forward until an error loss is generated in an output, and the parameter in the initial neural network model is updated through back propagation of information about the error loss, to converge the error loss. The back propagation algorithm is a back propagation motion dominated by the error loss, and is intended to obtain an optimal parameter, for example, a weight matrix, of the neural network model.

The foregoing briefly describes some basic content of neural networks, and the following describes some particular neural networks that may be used during image data processing.

Figure 3:
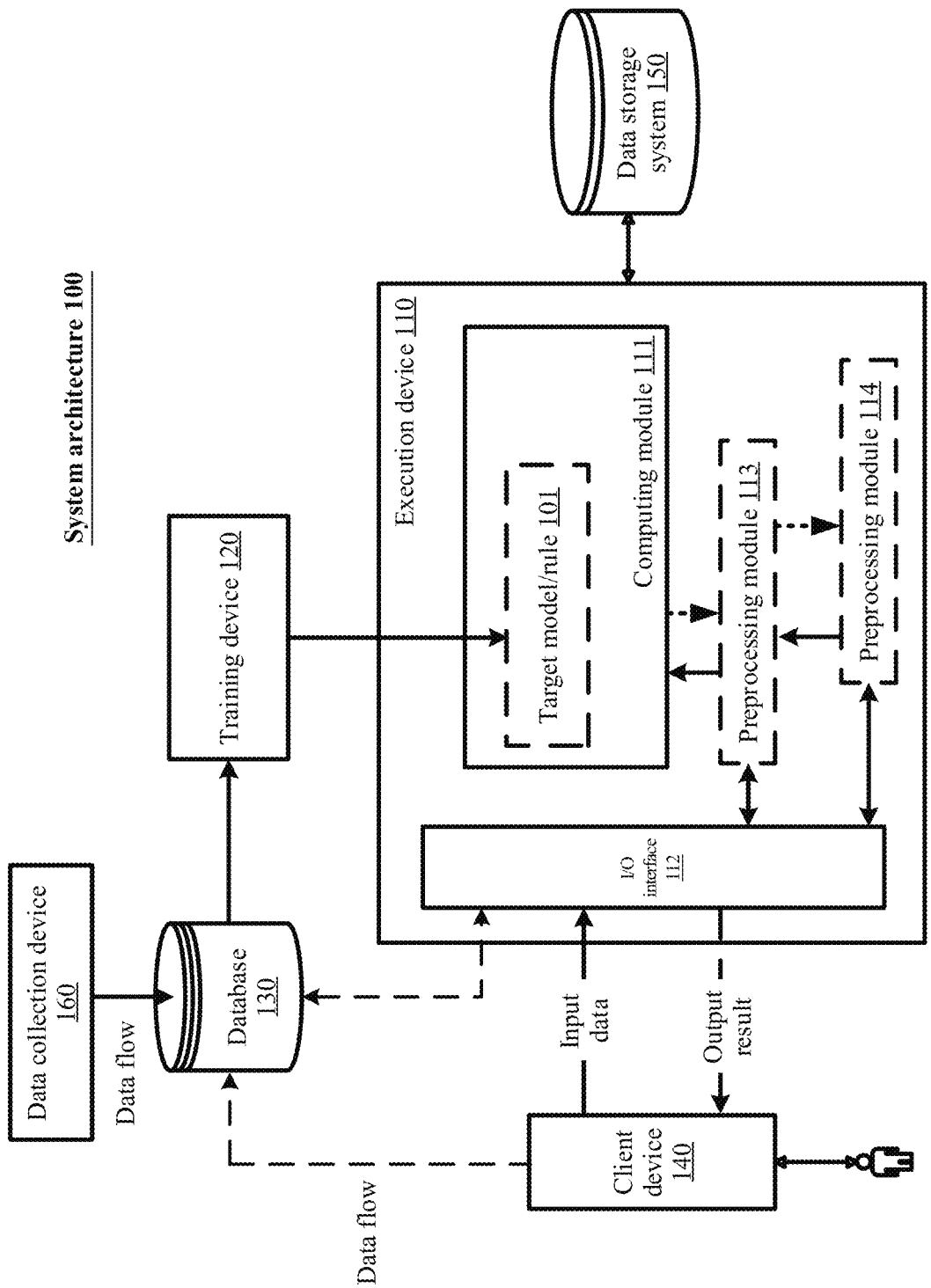
FIG. 3 is a schematic structural diagram of a system architecture according to an embodiment of this application.

The following describes in detail a system architecture in an embodiment of this application with reference to FIG. 3.

FIG. 3 is a schematic diagram of a system architecture according to an embodiment of this application. As shown in FIG. 3, the system architecture 100 includes an execution device 110, a training device 120, a database 130, a client device 140, a data storage system 150, and a data collection system 160.

In addition, the execution device 110 includes a computing module 111, an I/O interface 112, a preprocessing module 113, and a preprocessing module 114. The computing module 111 may include a target model/rule 101. The preprocessing module 113 and the preprocessing module 114 are optional.

The data collection device 160 is configured to collect training data. For the pedestrian detection method in the embodiments of this application, the training data may include a training image (the training image includes a pedestrian) and a marking file. The marking file provides coordinates of a bounding box (bounding box) including a pedestrian in a training picture. After collecting the training data, the data collection device 160 stores the training data in the database 130. The training device 120 obtains the target model/rule 101 through training based on the training data maintained in the database 130.

The following describes how the training device 120 obtains the target model/rule 101 based on the training data. The training device 120 performs object detection on an input training image, and compares an output pedestrian detection result (a bounding box including a pedestrian in the image and a confidence level of the bounding box including the pedestrian in the image) with a marking result, until a difference between a pedestrian detection result output by the training device 120 and the marking result is less than a specific threshold, to complete training of the target model/rule 101.

The target model/rule 101 can be used to implement the pedestrian detection method in the embodiments of this application. To be specific, a pedestrian detection result of a to-be-processed image may be obtained after the to-be-processed image (after related preprocessing) is input to the target model/rule 101. The target model/rule 101 in this embodiment of this application may be specifically a neural network. It should be noted that in actual application, the training data maintained in the database 130 is not necessarily all collected by the data collection device 160, and may be received from another device. In addition, it should be noted that the training device 120 does not necessarily train the target model/rule 101 completely based on the training data maintained in the database 130, and may obtain training data from a cloud side or another place to perform model training. The foregoing description should not be construed as a limitation on this embodiment of this application.

The target model/rule 101 obtained through training by the training device 120 may be applied to different systems or devices, for example, applied to the execution device 110 shown in FIG. 3. The execution device 110 may be a terminal, for example, a mobile phone terminal, a tablet computer, a notebook computer, an augmented reality (augmented reality, AR) terminal/a virtual reality (virtual reality, VR) terminal, or an in-vehicle terminal, or may be a server, a cloud side, or the like. In FIG. 3, the input/output (input/output, I/O) interface 112 is configured in the execution device 110, to exchange data with an external device. A user may input data to the I/O interface 112 by using the client device 140. In this embodiment of this application, the input data may include a to-be-processed image input by the client device. The client device 140 herein may be specifically a terminal device.

The preprocessing module 113 and the preprocessing module 114 are configured to perform preprocessing based on input data (for example, a to-be-processed image) received by the I/O interface 112. In this embodiment of this application, there may be only one or neither of the preprocessing module 113 and the preprocessing module 114. When the preprocessing module 113 and the preprocessing module 114 do not exist, the input data may be directly processed by using the computing module 111.

In a related processing process such as a process in which the execution device 110 preprocesses the input data or the computing module 111 of the execution device 110 performs computing, the execution device 110 may invoke data, code, and the like in the data storage system 150 for corresponding processing, and may store, in the data storage system 150, data, an instruction, and the like that are obtained through corresponding processing.

Finally, the I/O interface 112 presents a processing result, for example, a pedestrian detection result obtained through computing based on the target model/rule 101, to the client device 140, to provide the user with the processing result.

Specifically, the pedestrian detection result obtained through processing based on the target model/rule 101 in the computing module 111 may be processed by the preprocessing module 113 (or may be further processed by the preprocessing module 114), then sent to the I/O interface, and finally sent to the client device 140 by using the I/O interface for display.

It should be understood that when the preprocessing module 113 and the preprocessing module 114 do not exist in the system architecture 100, the pedestrian detection result obtained through processing may alternatively be transmitted by the computing module 111 to the I/O interface, and then sent by the I/O interface to the client device 140 for display.

It should be noted that the training device 120 may generate corresponding target models/rules 101 for different purposes, or referred to as different tasks, based on different training data, and the corresponding target models/rules 101 may be used to implement the purposes or complete the tasks, to provide required results for users.

In a case shown in FIG. 3, the user may manually give input data, and the manual giving may be operated by using an interface provided by the I/O interface 112. In another case, the client device 140 may automatically send input data to the I/O interface 112. If required to automatically send the input data, the client device 140 needs to be authorized by the user, and the user may set a corresponding permission in the client device 140. The user may view, on the client device 140, the result output by the execution device 110. A specific presentation form may be a specific manner such as display, sound, or an action. The client device 140 may also be used as a data collection end to collect input data input to the I/O interface 112 and an output result output from the I/O interface 112 that are shown in the figure, use the input data and the output result as new sample data, and store the new sample data in the database 130. Certainly, the input data input to the I/O interface 112 and the output result output from the I/O interface 112 that are shown in the figure may alternatively be directly stored in the database 130 as new sample data by the I/O interface 112 without being collected by the client device 140.

It should be noted that FIG. 3 is merely a schematic diagram of a system architecture according to an embodiment of this application. A position relationship between a device, a component, a module, and the like shown in the figure constitutes no limitation. For example, in FIG. 3, the data storage system 150 is an external memory relative to the execution device 110. In another case, the data storage system 150 may alternatively be configured in the execution device 110.

As shown in FIG. 3, the target model/rule 101 obtained through training by the training device 120 may be a neural network in the embodiments of this application. Specifically, the neural network provided in the embodiments of this application may be a CNN, a deep convolutional neural network (deep convolutional neural networks, DCNN), or the like.

Figure 4:
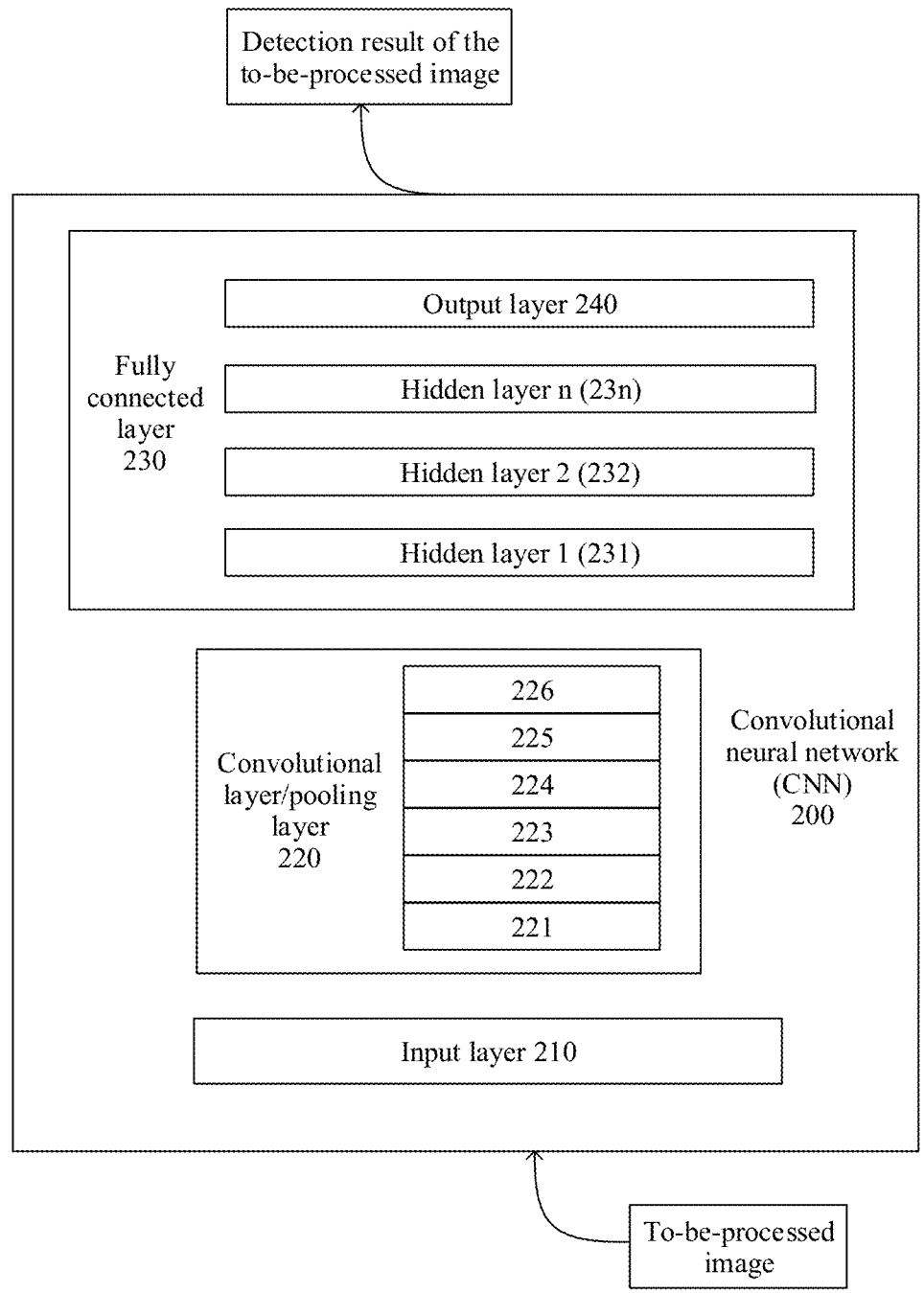
FIG. 4 is a schematic diagram of pedestrian detection performed by using a convolutional neural network model according to an embodiment of this application.

Because the CNN is a very common neural network, the following focuses on a detailed description of a structure of the CNN with reference to FIG. 4. As described in the foregoing basic concept description, the convolutional neural network is a deep neural network with a convolutional structure, and is a deep learning (deep learning) architecture. The deep learning architecture means performing multi-level learning at different abstract levels by using a machine learning algorithm. As a deep learning architecture, the CNN is a feed-forward (feed-forward) artificial neural network. Each neuron in the feed-forward artificial neural network may respond to an image input to the neural network.

As shown in FIG. 4, a convolutional neural network (CNN) 200 may include an input layer 210, a convolutional layer/pooling layer 220 (the pooling layer is optional), and a fully connected layer (fully connected layer) 230. The following describes related content of the layers in detail.

Convolutional Layer/Pooling Layer 220:
Convolutional Layer:

As shown in FIG. 4, the convolutional layer/pooling layer 220 may include, for example, layers 221 to 226. For example, in an implementation, the layer 221 is a convolutional layer, the layer 222 is a pooling layer, the layer 223 is a convolutional layer, the layer 224 is a pooling layer, the layer 225 is a convolutional layer, and the layer 226 is a pooling layer. In another implementation, 221 and 222 are convolutional layers, 223 is a pooling layer, 224 and 225 are convolutional layers, and 226 is a pooling layer. In other words, an output of a convolutional layer may be used as an input of a subsequent pooling layer, or may be used as an input of another convolutional layer to continue to perform a convolution operation.

The following describes an internal working principle of a convolutional layer by using the convolutional layer 221 as an example.

The convolutional layer 221 may include a plurality of convolution operators. The convolution operator is also referred to as a kernel, and functions in image processing like a filter for extracting particular information from an input image matrix. The convolution operator may be essentially a weight matrix, and the weight matrix is usually predefined. In a process of performing a convolution operation on an image, a weight matrix usually performs processing in a horizontal direction of one pixel after another pixel (or two pixels after two other pixels . . . , which depends on a value of a stride) on an input image, to complete extraction of a particular feature from the image. A size of the weight matrix should be related to a size of the image. It should be noted that a depth dimension (depth dimension) of the weight matrix is the same as a depth dimension of the input image. In the convolution operation process, the weight matrix extends to an entire depth of the input image. Therefore, convolution with a single weight matrix generates a convolution output of a single depth dimension. However, in most cases, the single weight matrix is not used, but instead, a plurality of weight matrices of a same size (rows×columns), namely, a plurality of homogeneous matrices, are used. Outputs of all the weight matrices are stacked to form a depth dimension of a convolutional image. The dimension herein may be understood as being determined by the "plurality of" described above. Different weight matrices may be used to extract different features in an image. For example, one weight matrix is used to extract edge information of the image, another weight matrix is used to extract a particular color of the image, and still another weight matrix is used to blur unwanted noise in the image. Sizes (rows×columns) of the plurality of weight matrices are the same, and sizes of convolutional feature maps obtained through extraction based on the plurality of weight matrices of the same size are also the same. Then, the plurality of extracted convolutional feature maps of the same size are combined to form an output of a convolution operation.

Weight values in these weight matrices need to be obtained through a large amount of training in actual application. Each weight matrix including weight values obtained through training may be used to extract information from an input image, so that the convolutional neural network 200 performs correct prediction.

When the convolutional neural network 200 has a plurality of convolutional layers, an initial convolutional layer (for example, 221) usually extracts a relatively large quantity of general features. The general features may also be referred to as low-level features. With deepening of the convolutional neural network 200, a later convolutional layer (for example, 226) extracts a more complex feature, for example, a high-level feature such as a semantic feature. A feature with a higher semantic meaning is more suitable for a to-be-resolved problem.

Pooling Layer:

Because a quantity of training parameters usually needs to be reduced, a pooling layer usually needs to be periodically introduced behind a convolutional layer. For the layers 221 to 226 shown in 220 in FIG. 4, one convolutional layer may be followed by one pooling layer, or a plurality of convolutional layers may be followed by one or more pooling layers. In an image processing process, a sole purpose of the pooling layer is to reduce a space size of an image. The pooling layer may include an average pooling operator and/or a maximum pooling operator, to sample an input image to obtain an image of a relatively small size. The average pooling operator may calculate, within a particular range, an average value of pixel values in an image as a result of average pooling. The maximum pooling operator may obtain, within a particular range, a pixel with a maximum value in the range as a result of maximum pooling. In addition, just as a size of a weight matrix in the convolutional layer should be related to a size of an image, the operator in the pooling layer should also be related to a size of an image. A size of an image output after processing performed by the pooling layer may be less than a size of an image input to the pooling layer. Each pixel in the image output by the pooling layer represents an average value or a maximum value of a corresponding sub-region of the image input to the pooling layer.

Fully Connected Layer 230:

After processing of the convolutional layer/pooling layer 220, the convolutional neural network 200 is still insufficient for outputting required output information. As described above, the convolutional layer/pooling layer 220 only extracts a feature and reduces parameters brought by an input image. However, to generate final output information (required category information or other related information), the convolutional neural network 200 needs to use the fully connected layer 230 to generate a quantity of outputs of one or a set of required categories. Therefore, the fully connected layer 230 may include a plurality of hidden layers (231 and 232 to 23n shown in FIG. 4) and an output layer 240. Parameters included in the plurality of hidden layers may be obtained through pre-training based on related training data of a specific task type. For example, the task type may include image recognition, image classification, or super-resolution image reconstruction.

The output layer 240 is behind the plurality of hidden layers in the fully connected layers 230, and is the last layer of the entire convolutional neural network 200. The output layer 240 has a loss function similar to classification cross entropy, and is specifically configured to calculate a prediction error. Once forward propagation (for example, in FIG. 4, propagation in a direction from 210 to 240 is forward propagation) of the entire convolutional neural network 200 is completed, back propagation (for example, in FIG. 4, propagation in a direction from 240 to 210 is back propagation) starts to update a weight value and a bias of each layer mentioned above, to reduce a loss of the convolutional neural network 200 and an error between a result output by the convolutional neural network 200 by using the output layer and an ideal result.

It should be noted that the convolutional neural network 200 shown in FIG. 4 is merely used as an example of a convolutional neural network. In specific application, the convolutional neural network may alternatively exist in a form of another network model.

It should be understood that the convolutional neural network (CNN) 200 shown in FIG. 4 may be used to perform the pedestrian detection method in the embodiments of this application. As shown in FIG. 4, after a to-be-processed image is processed by the input layer 210, the convolutional layer/pooling layer 220, and the fully-connected layer 230, a detection result (a bounding box including a pedestrian in the to-be-processed image and a confidence level of the bounding box including the pedestrian in the image) of the to-be-processed image may be obtained.

Figure 5:
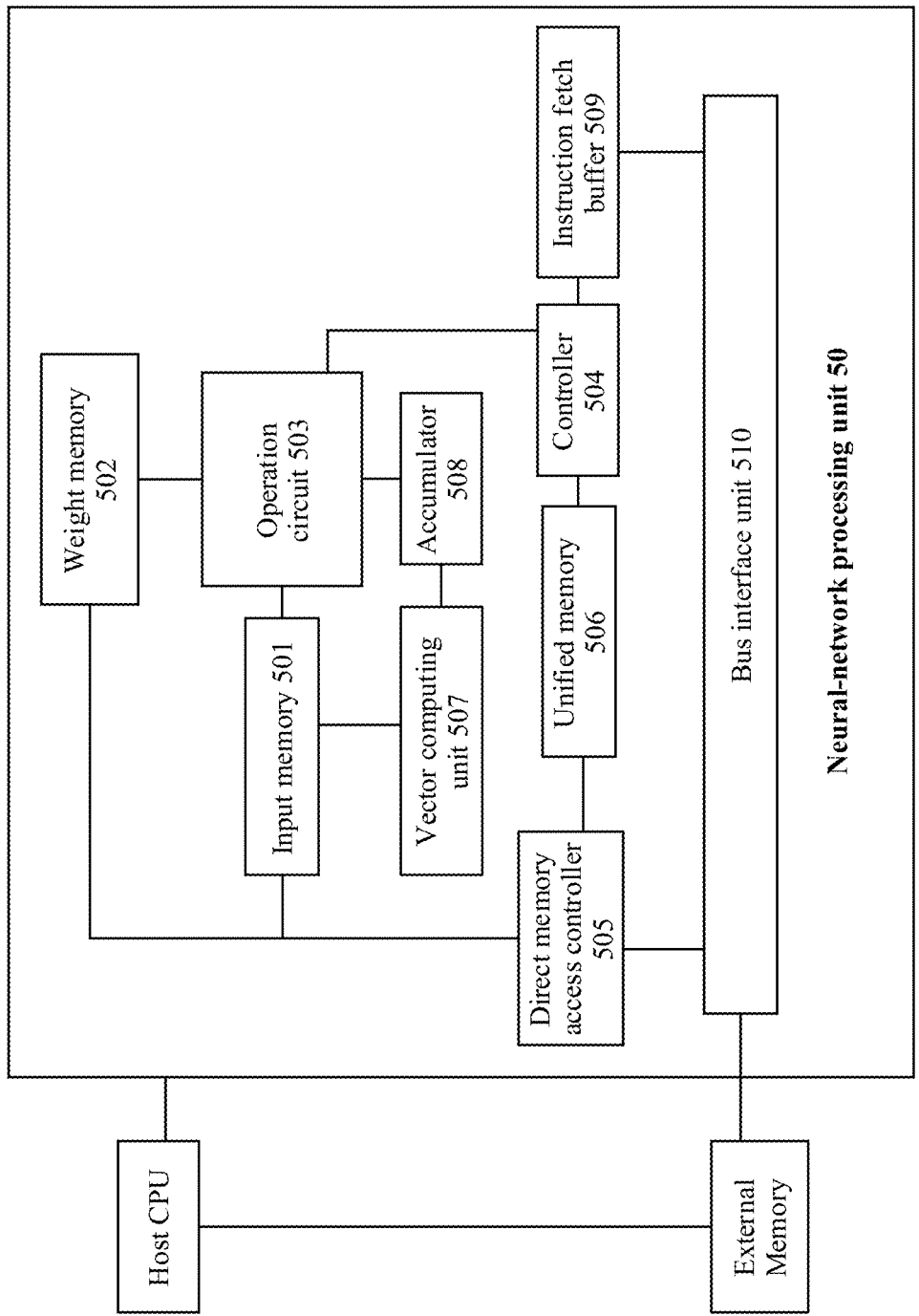
FIG. 5 is a schematic diagram of a hardware structure of a chip according to an embodiment of this application.

FIG. 5 shows a hardware structure of a chip according to an embodiment of this application. The chip includes a neural-network processing unit 50. The chip may be disposed in the execution device 110 shown in FIG. 3, to complete computing work of the computing module 111. Alternatively, the chip may be disposed in the training device 120 shown in FIG. 3, to complete training work of the training device 120 and output the target model/rule 101. Algorithms of all the layers in the convolutional neural network shown in FIG. 4 may be implemented in the chip shown in FIG. 5.

The neural-network processing unit (neural-network processing unit, NPU) 50 is connected to a host central processing unit (central processing unit, CPU) (host CPU) as a coprocessor, and is allocated a task by the host CPU. A core part of the NPU is an operation circuit 503. A controller 504 controls the operation circuit 503 to extract data from a memory (a weight memory or an input memory) and perform an operation.

In some implementations, the operation circuit 503 internally includes a plurality of processing elements (process engine, PE). In some implementations, the operation circuit 503 is a two-dimensional systolic array. Alternatively, the operation circuit 503 may be a one-dimensional systolic array or another electronic circuit that can perform mathematical operations such as multiplication and addition. In some implementations, the operation circuit 503 is a general-purpose matrix processor.

For example, it is assumed that there is an input matrix A, a weight matrix B, and an output matrix C. The operation circuit 503 obtains data corresponding to the matrix B from the weight memory 502, and buffers the data in each PE in the operation circuit 503. The operation circuit 503 obtains data of the matrix A from the input memory 501, performs a matrix operation on the matrix A and the matrix B, and stores an obtained partial result or final result of the matrices in an accumulator (accumulator) 508.

A vector computing unit 507 may perform further processing, for example, vector multiplication, vector addition, an exponential operation, a logarithmic operation, or value comparison, on an output of the operation circuit 503. For example, the vector computing unit 507 may be configured to perform network computing, for example, pooling (pooling), batch normalization (batch normalization), or local response normalization (local response normalization), in a non-convolution/non-FC layer in a neural network.

In some implementations, the vector computing unit 507 can store a processed output vector in a unified buffer 506. For example, the vector computing unit 507 may apply a non-linear function to the output, for example, a vector of an accumulated value, of the operation circuit 503 to generate an activation value. In some implementations, the vector computing unit 507 generates a normalized value, a combined value, or both. In some implementations, the processed output vector can be used as an activation input to the operation circuit 503, for example, used in a subsequent layer in the neural network.

The unified memory 506 is configured to store input data and output data.

A direct memory access controller (direct memory access controller, DMAC) 505 transfers input data in an external memory to the input memory 501 and/or the unified memory 506, stores, in the weight memory 502, weight data in the external memory, and stores, in the external memory, data in the unified memory 506.

A bus interface unit (bus interface unit, BIU) 510 is configured to implement interaction between the host CPU, the DMAC, and an instruction fetch buffer 509 by using a bus.

The instruction fetch buffer (instruction fetch buffer) 509 connected to the controller 504 is configured to store an instruction used by the controller 504.

The controller 504 is configured to invoke the instruction buffered in the instruction fetch buffer 509, to control a working process of the operation accelerator.

Generally, the unified memory 506, the input memory 501, the weight memory 502, and the instruction fetch buffer 509 are all on-chip (on-chip) memories. The external memory is a memory outside the NPU. The external memory may be a double data rate synchronous dynamic random access memory (double data rate synchronous dynamic random access memory, DDR SDRAM for short), a high bandwidth memory (high bandwidth memory, HBM), or another readable and writable memory.

In addition, in this application, an operation in each layer in the convolutional neural network shown in FIG. 4 may be performed by the operation circuit 503 or the vector computing unit 507.

Figure 6:
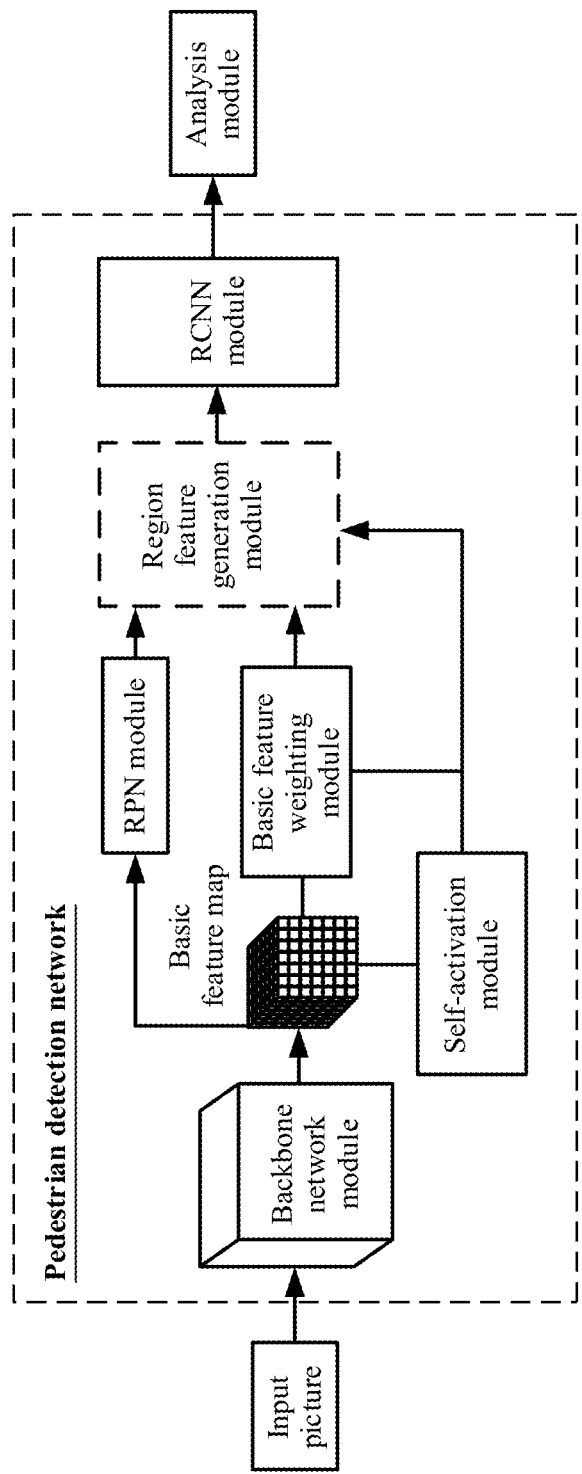
FIG. 6 is a schematic block diagram of a pedestrian detection apparatus according to an embodiment of this application.

FIG. 6 is a schematic diagram of a system architecture according to an embodiment of this application.

As shown in FIG. 6, after an input image is processed by using the pedestrian detection network, 2D boxes (the 2D boxes may also be referred to as bounding boxes) including a pedestrian in the input image may be obtained. Information about the 2D boxes is sent to a subsequent analysis module for processing, for example, sent to a regulatory unit in an automated driving system for obstacle analysis, or sent to an analysis module in Safe City for matching with a missing person.

The pedestrian detection network shown in FIG. 6 includes a backbone (backbone) network module, a region proposal network (region proposal network, RPN) module, a self-activation module, a basic feature weighting module, a region feature generation module, a region convolutional neural network (region convolutional neural network, RCNN) module, and an output module. The pedestrian detection network in FIG. 6 may perform the pedestrian detection method in the embodiments of this application. The following briefly describes a process in which the pedestrian detection network processes an input picture.

After obtaining the input picture, the backbone network module performs convolution processing on the input image to obtain a basic feature map of the input picture. The RPN module processes the basic feature map to obtain a pedestrian proposal of the input picture. The self-activation module performs further convolution processing and weighted summation processing on the basic feature map to obtain an object visibility map of the input picture (the object visibility map can highlight a feature of a pedestrian visible part in the input picture). The basic feature weighting module is configured to perform weighting processing on the object visibility map and the basic feature map to obtain an enhanced feature map. The region feature module may generate a feature corresponding to the proposal based on the proposal and the object visibility map of the input picture. The RCNN module processes the feature corresponding to the proposal to obtain a pedestrian detection result of the input picture. The pedestrian detection result may be a bounding box including a pedestrian in an image and a confidence level of the bounding box including the pedestrian in the image.

A product form in which a pedestrian detection apparatus in the embodiments of this application is implemented may be automated driving, a terminal device, a monitoring device, or the like. This application is deployed on a computing node of a related device, and accuracy of pedestrian recognition can be improved through software reconstruction.

Figure 7:
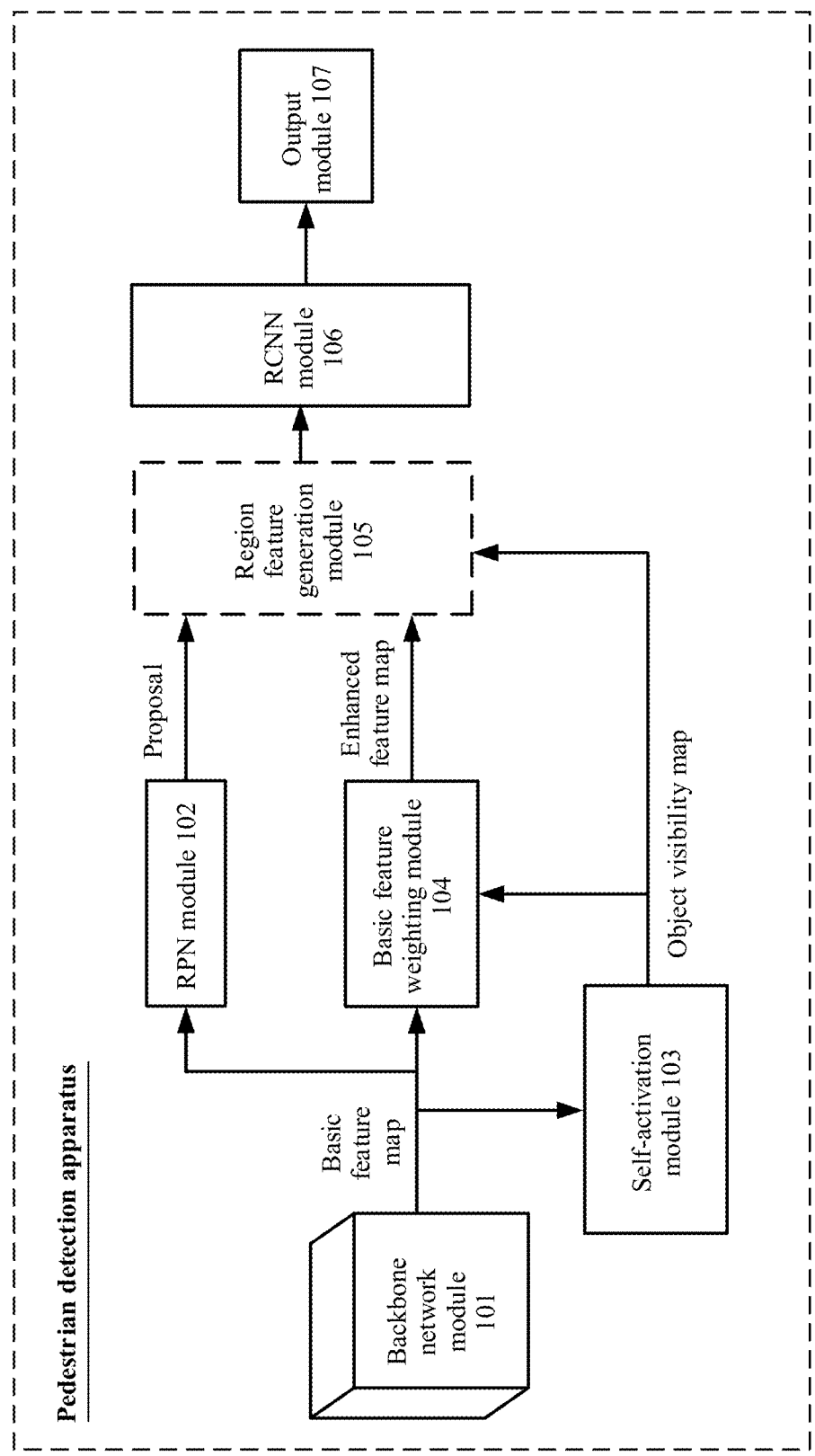
FIG. 7 is a schematic block diagram of a pedestrian detection apparatus according to an embodiment of this application.

The pedestrian detection apparatus in the embodiments of this application may be shown in FIG. 7. The pedestrian detection apparatus mainly includes a backbone network module 101, an RPN module 102, a self-activation module 103, a basic feature weighting module 104, a region feature generation module 105, an RCNN module 106, and an output module 107.

The pedestrian detection apparatus shown in FIG. 7 may include the region feature generation module 105, or may not include the region feature generation module 105.

Figure 8A:
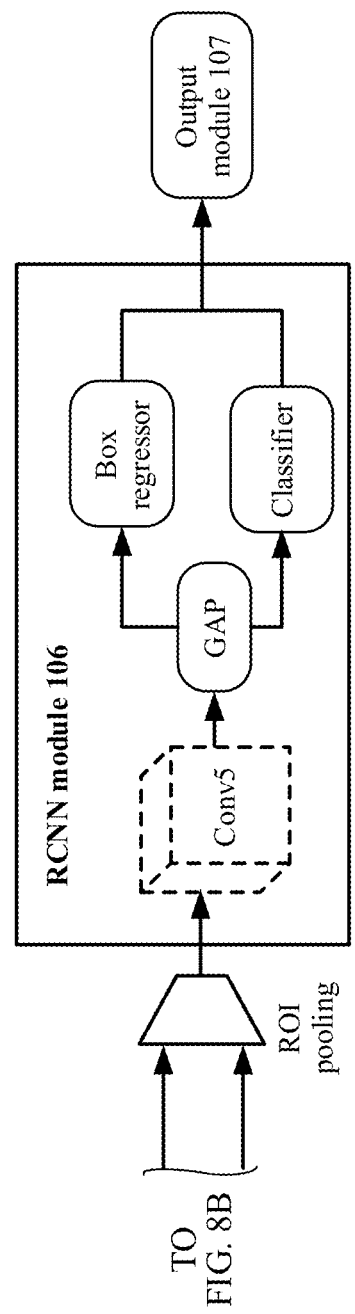
FIG. 8A and FIG. 8B are a schematic diagram of pedestrian detection performed by using a pedestrian detection apparatus.
Figure 8B:
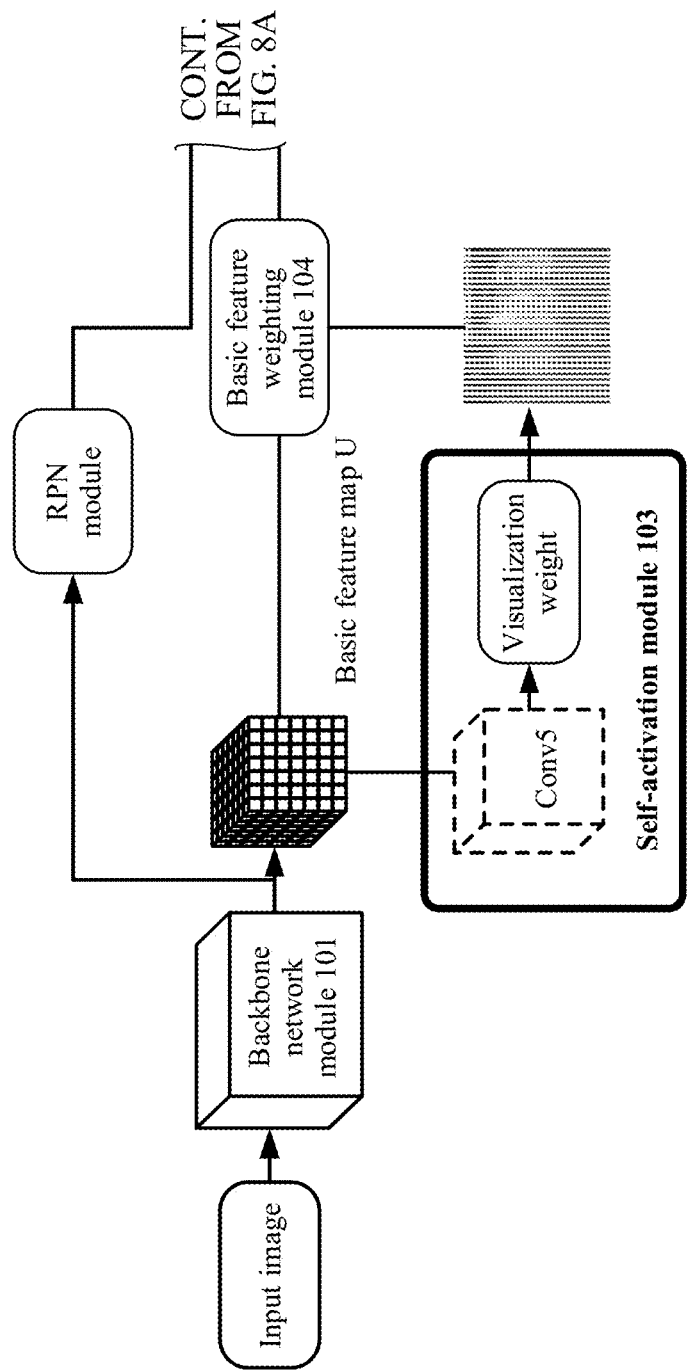

When the pedestrian detection apparatus does not include the region feature generation module 105, the pedestrian detection apparatus and a process of performing pedestrian detection by using the pedestrian detection apparatus may be shown in FIG. 8A and FIG. 8B.

As shown in FIG. 8A and FIG. 8B, the RPN module determines a proposal of an image based on a basic feature map, the self-activation module 103 generates an object visibility map of the image based on the basic feature map, and the basic feature weighting module 104 performs weighted summation on the object visibility map and the basic feature map of the image to obtain an enhanced feature map. Then, a feature corresponding to the proposal may be extracted from the enhanced feature map through region of interest (region of interest, ROI) pooling, and then the RCNN module processes the feature corresponding to the proposal to obtain a pedestrian detection result. It should be understood that in FIG. 8A and FIG. 8B, the feature corresponding to the proposal is a region feature of the proposal.

Figure 9A:
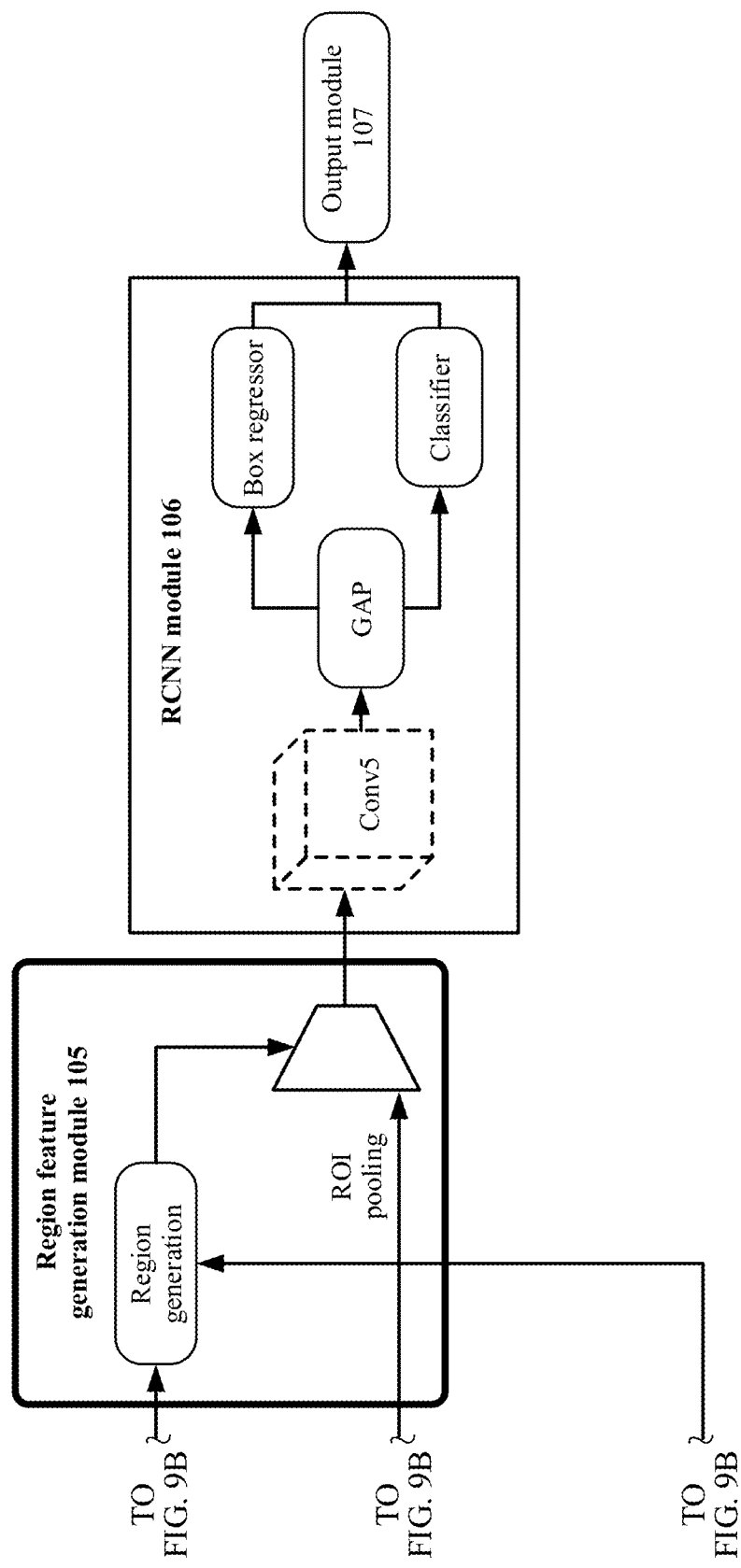
FIG. 9A and FIG. 9B are a schematic diagram of pedestrian detection performed by using a pedestrian detection apparatus.
Figure 9B:
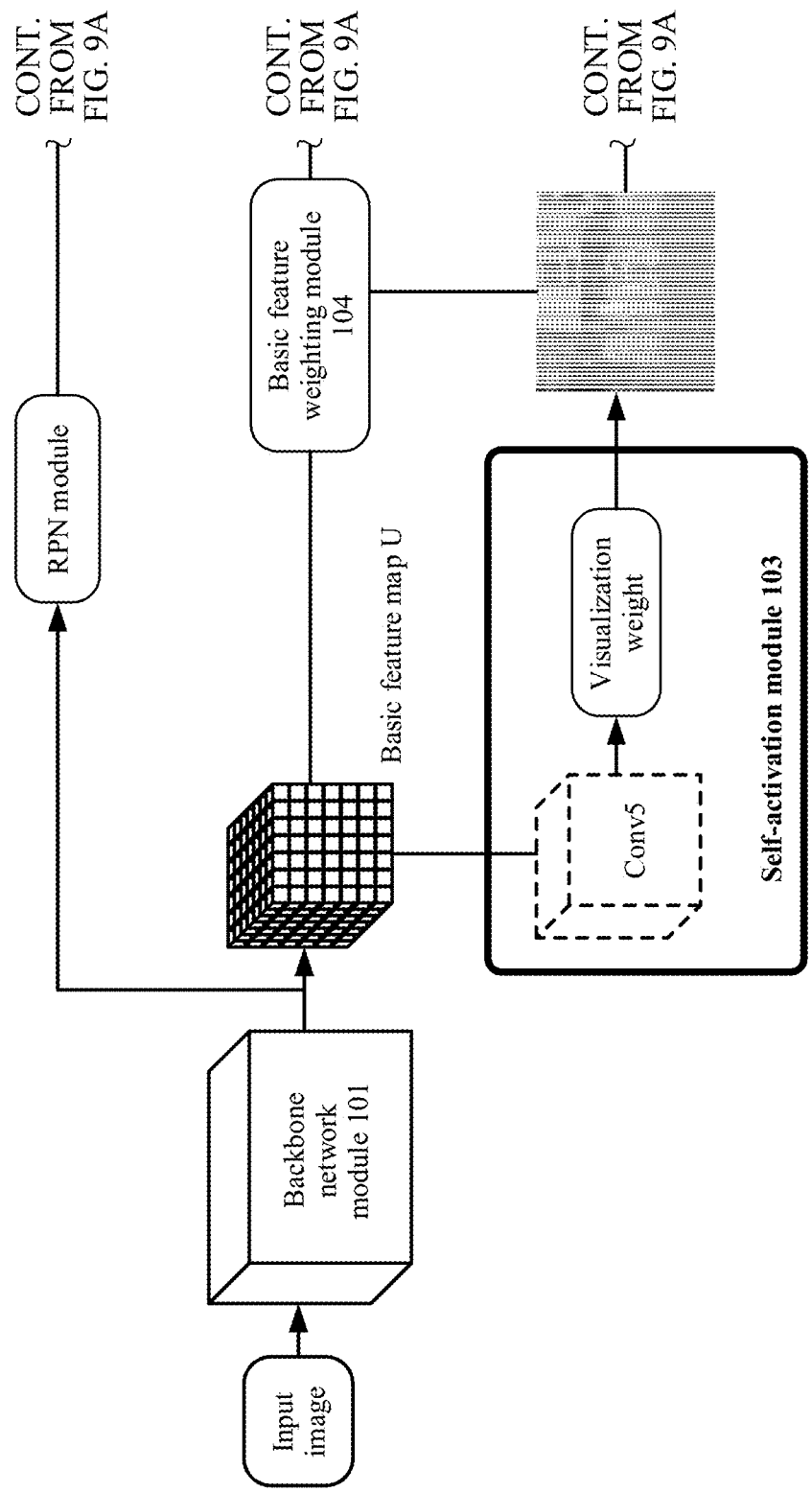

When the pedestrian detection apparatus includes the region feature generation module 105, the pedestrian detection apparatus and a process of performing pedestrian detection by using the pedestrian detection apparatus may be shown in FIG. 9A and FIG. 9B.

Compared with FIG. 8A and FIG. 8B, the pedestrian detection apparatus shown in FIG. 9A and FIG. 9B uses the region feature generation module 105 to generate a region feature of a proposal, a region feature of a contour region of the proposal, and a region feature of a background region of the proposal. The three features may be fused into a feature corresponding to the proposal. Then, the RCNN module processes the feature corresponding to the proposal to obtain a pedestrian detection result.

To better understand a process of performing the pedestrian detection method in the embodiments of this application, the following first briefly describes functions of the modules in FIG. 7.

Backbone Network Module 101:

The backbone network module 101 is configured to perform a series of convolution processing on an input image (which may also be referred to as a picture) to obtain a basic feature map (feature map) of the image. The basic feature map of the image provides a basic feature of the image for subsequent image detection performed by another module.

A backbone network in the backbone network module 101 may be implemented in a plurality of manners, for example, a VGG network, a deep residual network (deep residual network, ResNet), and an inception network.

RPN Module 102:

The RPN module 102 is configured to predict, on the basic feature map generated by the backbone network module 101, regions possibly including a pedestrian, and provide locations of these regions. A boundary of the region may be referred to as a proposal (proposal). Generally, the location that is of the proposal and that is obtained by the RPN module 102 through detection is not very accurate, and the proposal may fall on background of the image, or may not well bound a pedestrian target in the image.

Self-Activation Module 103:

The self-activation module performs, by using a shared Conv5 convolutional layer in the RCNN module 106, further convolution processing on the basic feature map generated by the backbone network module 101 to obtain a higher-layer semantic feature map, and then weights the higher-layer semantic feature map by using a weight coefficient that is in a classifier and that is the same as that in the RCNN module 106, to obtain an object visibility map (visibility map) of the image. The object visibility map of the image has a strong response to a pedestrian visible part, and has a weak response to background and a blocked part. The self-activation module 103 is a core module of the pedestrian detection apparatus in this application.

Basic Feature Weighting Module 104:

The basic feature weighting module 104 is configured to perform weighting processing on the basic feature map, generated by the backbone network module 101, of the image and the object visibility map, generated by the self-activation module 103, of the image to obtain an enhanced feature map of the image. In the enhanced feature map of the image, a feature of the pedestrian visible part is enhanced, and the background in the image and a feature of an obstruction that blocks a pedestrian are weakened.

Region Feature Generation Module 105:

The region feature generation module 105 processes, with reference to the object visibility map that is of the image and that is generated by the self-activation module 103, each proposal generated by the RPN module 102, to generate a contour region image, a background region image, and an ROI region image of a pedestrian corresponding to the current proposal, extracts features of the three region images by using a region of interest pooling (pooling) module of the region feature generation module 105, and then fuses the extracted features of the three region images as a region feature of the current proposal.

RCNN Module 106:

The RCNN module 106 performs, by using a Conv5 convolutional layer that is the same as that of the self-activation module 103, convolution processing on the region feature that is of the proposal and that is generated by the region feature generation module 105, to obtain an image feature of a proposal region, then performs an averaging operation on the image feature of the proposal region by using a global average pooling (global average pooling, GAP) module, and finally, sends an averaged image feature to each of a box regressor and a classifier to predict final coordinates and a confidence level of the proposal.

Output Module 107:

The output module 107 is configured to perform non-maximum suppression (non-maximize suppression, NMS) processing on all proposals output by the RCNN module 106, to combine highly overlapped proposals and filter out a proposal with an excessively low confidence level, to output a 2D box (equivalent to a bounding box mentioned below) and a confidence level of the 2D box that reflect a pedestrian detection result.

Figure 10:
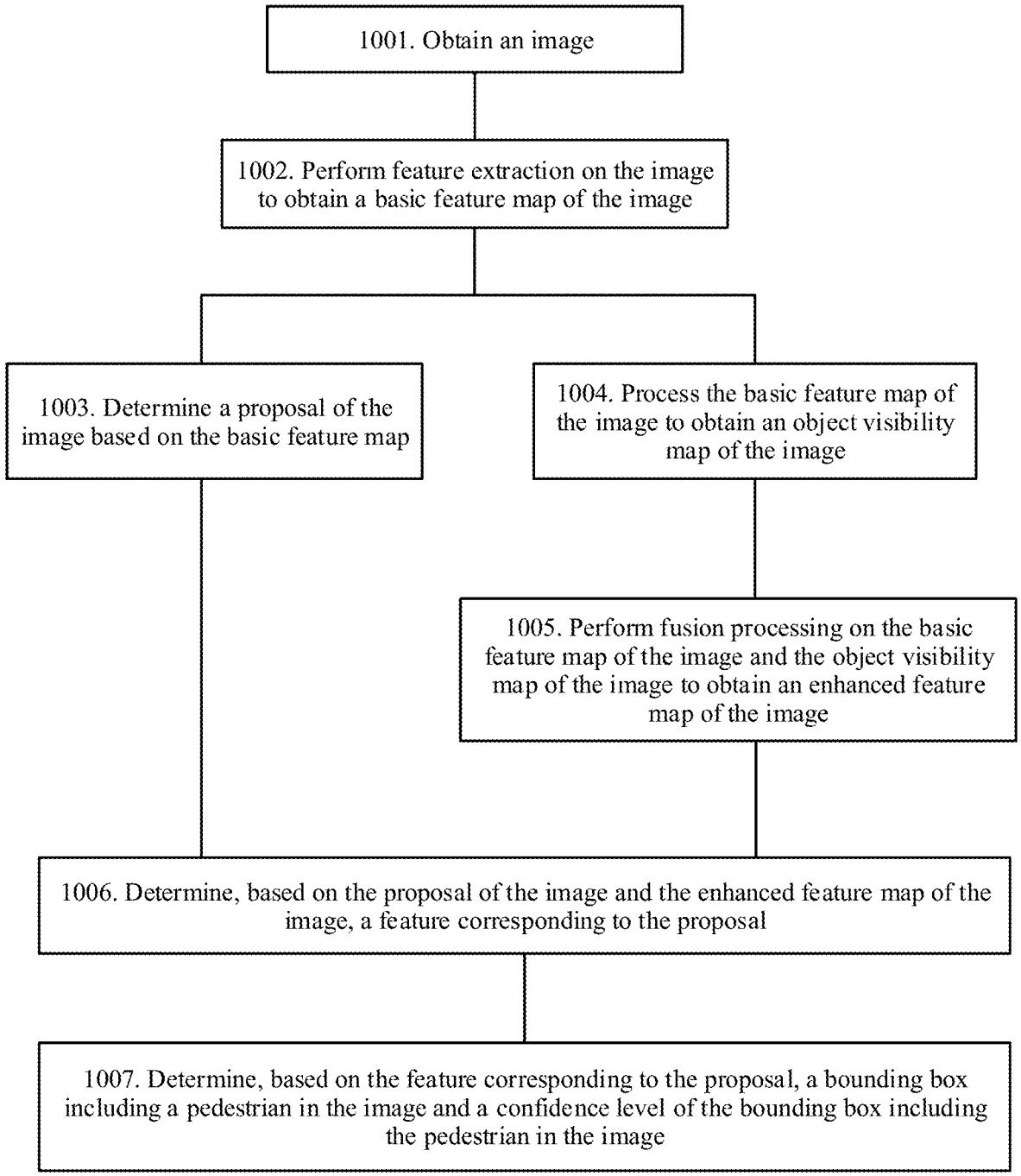
FIG. 10 is a schematic flowchart of a pedestrian detection method according to an embodiment of this application.

The following describes in detail the pedestrian detection method in the embodiments of this application with reference to FIG. 10.

FIG. 10 is a schematic flowchart of a pedestrian detection method according to an embodiment of this application. The method shown in FIG. 10 may be performed by the pedestrian detection apparatus in this application. The method shown in FIG. 10 includes steps 1001 to 1007. The following describes steps 1001 to 1007 in detail.

1001. Obtains an image.

The image may be an image including a pedestrian.

Specifically, the image may be various images including a pedestrian, for example, an image captured by using a mobile phone or another intelligent terminal, a road picture obtained by a driver assistance/automated driving system, or a surveillance picture obtained by a Safe City/video surveillance system.

It should be understood that the image captured by using the mobile phone or the intelligent terminal, the road picture, and the surveillance picture are generally images including a pedestrian. If these images do not include a pedestrian, final recognition results may be empty. In other words, no bounding box including a pedestrian can be obtained from recognition performed on such images that do not include a pedestrian.

In step 1001, the image may be obtained through photographing by using a camera, or the image may be obtained from a memory. It should be understood that the method shown in FIG. 1 may alternatively directly start from step 1002.

1002. Perform feature extraction on the image to obtain a basic feature map of the Image.

When the basic feature map of the image is obtained in step 1002, the basic feature map may be specifically obtained by performing a convolution operation (convolution processing) on the image, or performing further processing (for example, an operation such as summation, weighting processing, or concatenation) on a result of the convolution operation on the image.

In step 1002, convolution processing may be performed on the image by using a backbone network (module) in a neural network, to obtain the basic feature map (feature map) of the image. The backbone network may use a plurality of convolutional network architectures, for example, a VGG network (a network proposed by a visual geometry group (visual geometry group) of Oxford University), a deep residual network (deep residual network, ResNet), and an inception network.

The basic feature map may include a plurality of channels. In step 1002, when feature extraction is performed on the image, specifically, convolution processing may be performed on the image to obtain the basic feature map. A process of obtaining a basic feature map through convolution processing may be shown in FIG. 11.

Figure 11:
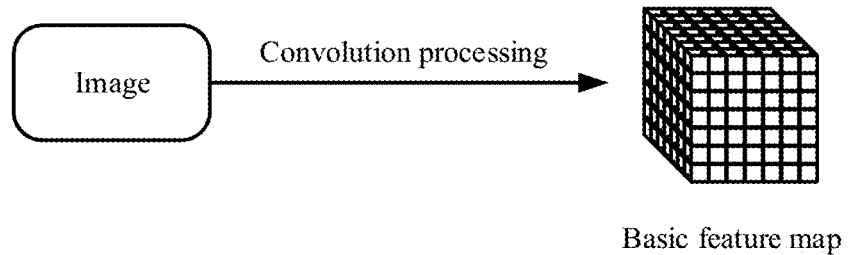
FIG. 11 is a schematic diagram of performing convolution processing on an image to obtain a basic feature map.

As shown in FIG. 11, the basic feature map is a feature map including a plurality of channels. In FIG. 11, it is assumed that a resolution of an input image is $H_0*W_0*3$ (a height is $H_0$, a width is $W_0$, and a quantity of channels is 3, that is, three channels of RBG). Then, a basic feature map $U \in H*W*K$ may be obtained after convolution processing. H and K represent, respectively, a height and a width of the basic feature map, and K indicates a quantity of channels of the basic feature map.

A process of generating the basic feature map of the image in step 1002 is described below in detail with reference to FIG. 12.

Figure 12:
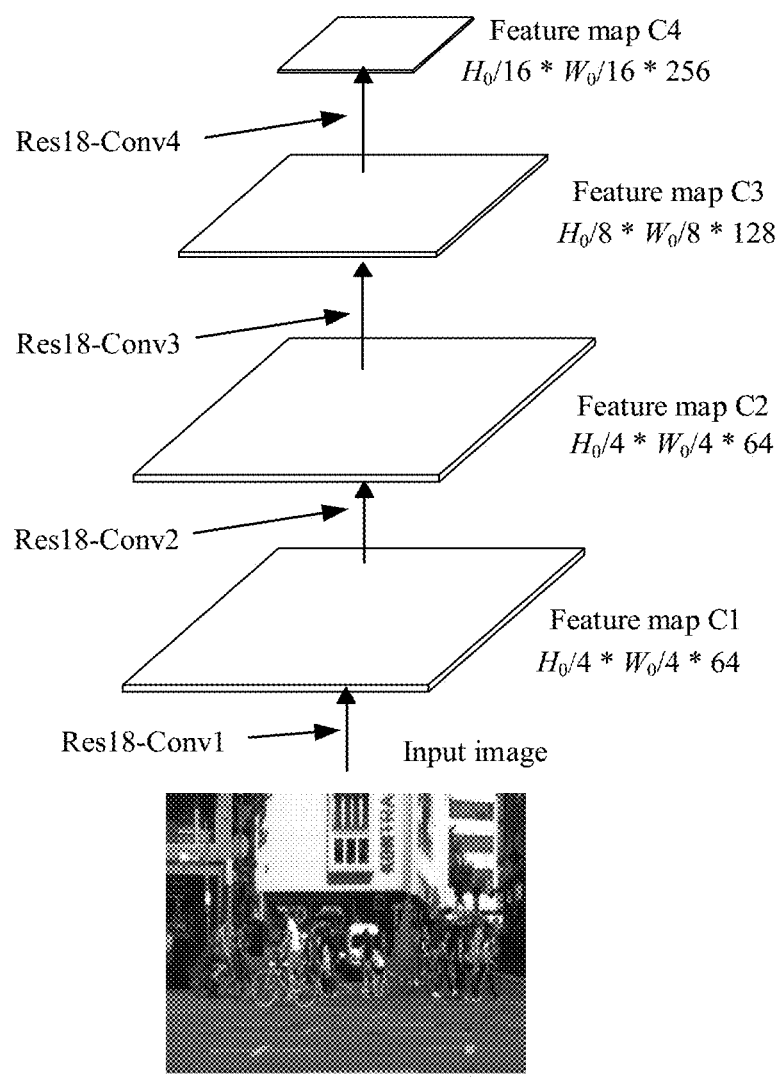
FIG. 12 is a schematic diagram of a process of generating a basic feature map of an image.

As shown in FIG. 12, a convolution operation may be performed on an input image by using different convolutional layers of a residual network ResNet18. Specifically, the convolution operation shown in FIG. 12 may specifically include the following processes (1) to (4):

(1) ResNet18-Conv1 (the first convolutional layer of ResNet18) performs convolution processing on the input image to obtain a feature map C1 (feature map C1).

Assuming that a resolution of the input image is $H_0*W_0*3$ (a height is $H_0$, a width is $W_0$, and a quantity of channels is 3), a resolution of the feature map C1 obtained after the convolution processing of ResNet18-Conv1 may be $H_0/4*W_0/4*64$. Specifically, ResNet18-Conv1 may perform downsampling on the input image twice (each time when a sampling operation is performed, each of a width and a height becomes half of that at a previous time), and expand the quantity of channels from 3 to 64, to obtain the feature map C1.

(2) ResNet18-Conv2 (the second convolutional layer of ResNet18) continues to perform convolution processing on the feature map C1 to obtain a feature map C2 (feature map C2).

ResNet18-Conv2 continues to perform convolution processing on the feature map C1, and a resolution of the obtained feature map C2 may be the same as the resolution of the feature map C1, that is, $H_0/4*W_0/4*64$.

(3) ResNet18-Conv3 (the third convolutional layer of ResNet18) continues to perform convolution processing on the feature map C2 to obtain a feature map C3 (feature map C3).

ResNet18-Conv3 may further perform downsampling on the feature map C2 once and double the quantity of channels (expand the quantity of channels from 64 to 128) to obtain the feature map C3. A resolution of the feature map C3 is $H_0/8*W_0/8*128$.

(4) ResNet18-Conv4 (the fourth convolutional layer of ResNet18) continues to perform convolution processing on the feature map C3 to obtain a feature map C4 (feature map C4).

ResNet18-Conv4 may further perform downsampling on the feature map C3 once and double the quantity of channels (expand the quantity of channels from 128 to 256) to obtain the feature map C4. A resolution of the feature map C4 is $H_0/16*W_0/16*256$.

It should be understood that the convolution process shown in FIG. 12 is merely an example. In this embodiment of this application, a network used for convolution processing, a quantity of times of convolution processing, and the like are not limited.

The convolution processing process shown in FIG. 12 is used as an example. The basic feature map in step 1002 may be the feature map C4 shown in FIG. 12, or may be at least one of the convolutional feature map C1 to the feature map C4 shown in FIG. 12.

When the basic feature map includes a plurality of feature maps that are of different resolutions and that are shown in FIG. 12, in a subsequent ROI pooling process, these feature maps of different resolutions may be adjusted to feature maps of a same resolution, and input to a subsequent RCNN module for further processing.

1003. Determine a proposal of the image based on the basic feature map.

The proposal is a bounding box of a region possibly including a pedestrian in the image. A region in which the proposal is located may be a region bounded by the proposal (a region inside the proposal). The region in which the proposal is located is a region possibly including a pedestrian in the image.

In step 1003, regions possibly including a pedestrian may be predicted based on the basic feature map of the image by using an RPN module, and framed. Frames that frame these regions are proposals.

Generally, a location of the proposal determined in step 1003 is not very accurate, and the proposal may fall on a background image (in this case, there may be no pedestrian target in the proposal), or may not well bound a pedestrian target.

In step 1003, the basic feature map may be generally processed by using the RPN module, to obtain a proposal. A process in which the RPN module determines a proposal of an image is described below in detail with reference to FIG. 13.

Figure 13:
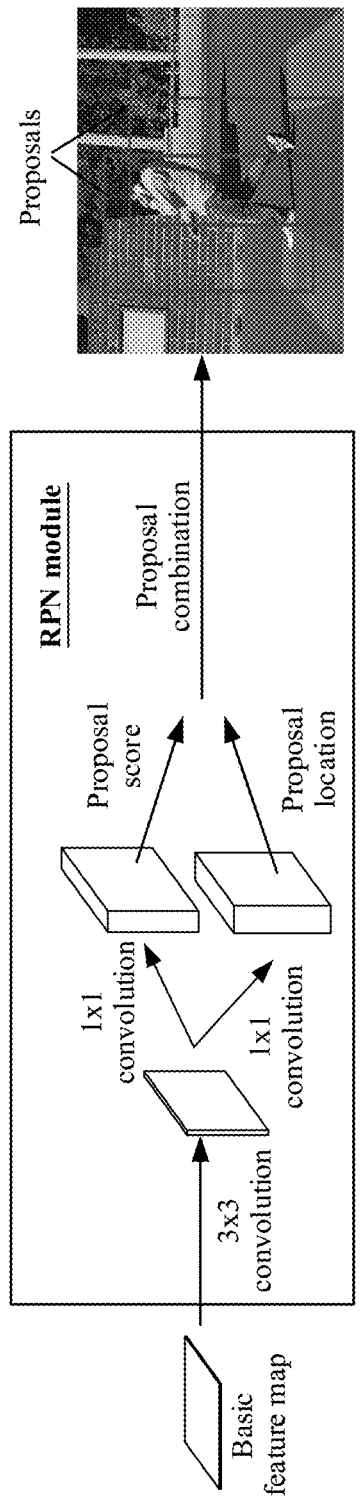
FIG. 13 is a schematic diagram of a process in which an RPN module determines a proposal of an image.

As shown in FIG. 13, the RPN module may first perform convolution processing on the basic feature map by using a 3×3 convolution kernel, to obtain an RPN hidden (RPN Hidden) feature map. Then, convolution processing is separately performed on the RPN hidden feature map by using two 3×3 convolution kernels, to predict a location and a confidence level of each proposal in the RPN hidden feature map. Generally, a higher confidence level of the proposal indicates a higher probability that the proposal includes a pedestrian.

Then, the RPN module performs combination processing on proposals obtained through prediction. During the combination processing, a redundant proposal may be removed according to a degree of overlapping between proposals. In a process of removing a redundant proposal, the proposal may be screened out by using, but not limited to, an NMS algorithm.

Assuming that the RPN module predicts J proposals in total, N (N<J) proposals with higher scores may be selected from the J proposals as proposals including a pedestrian. Both N and J are positive integers.

However, a location that is of a proposal of the image and that is determined by using the RPN module is generally not very accurate either. As shown in FIG. 13, although there is a pedestrian in each of two proposals, the pedestrian is not completely included in the proposal, and the pedestrian occupies only a small proportion of the proposal.

1004. Process the basic feature map of the image to obtain an object visibility map of the image.

The object visibility map of the image has different response degrees to different objects. In the object visibility map of the image, a response degree to a pedestrian visible part is greater than a response degree to a pedestrian invisible part. In other words, in the object visibility map of the image, the object visibility map of the image has a strong response to the pedestrian visible part, and has a weak response to the pedestrian invisible part. A feature of the pedestrian visible part is highlighted relative to a feature of the pedestrian invisible part.

Specifically, in the object visibility map of the image, a pixel value of the pedestrian visible part is greater than a pixel value of the pedestrian invisible part.

Figure 14:
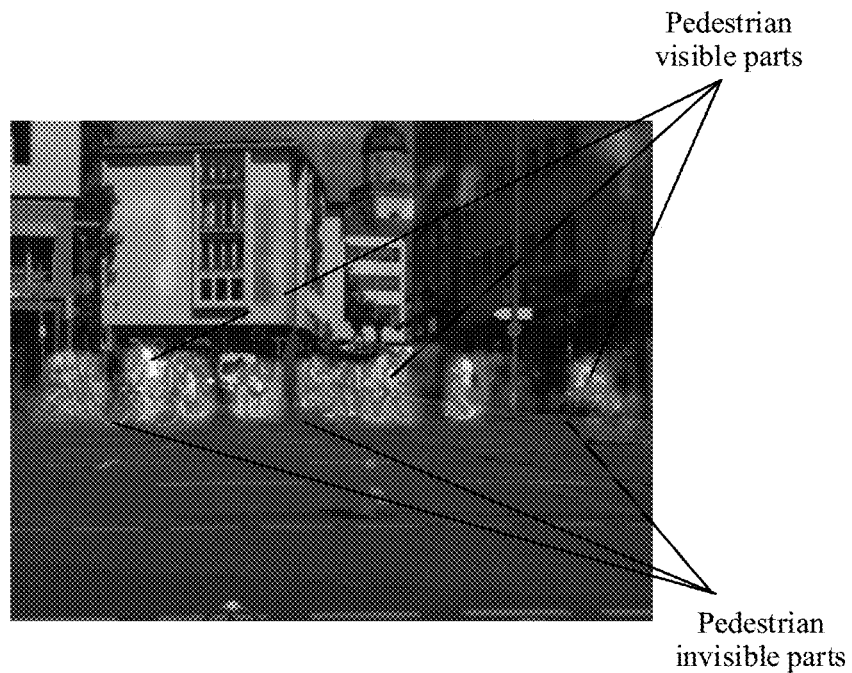
FIG. 14 is a schematic diagram of an object visibility map.
Figure 15:
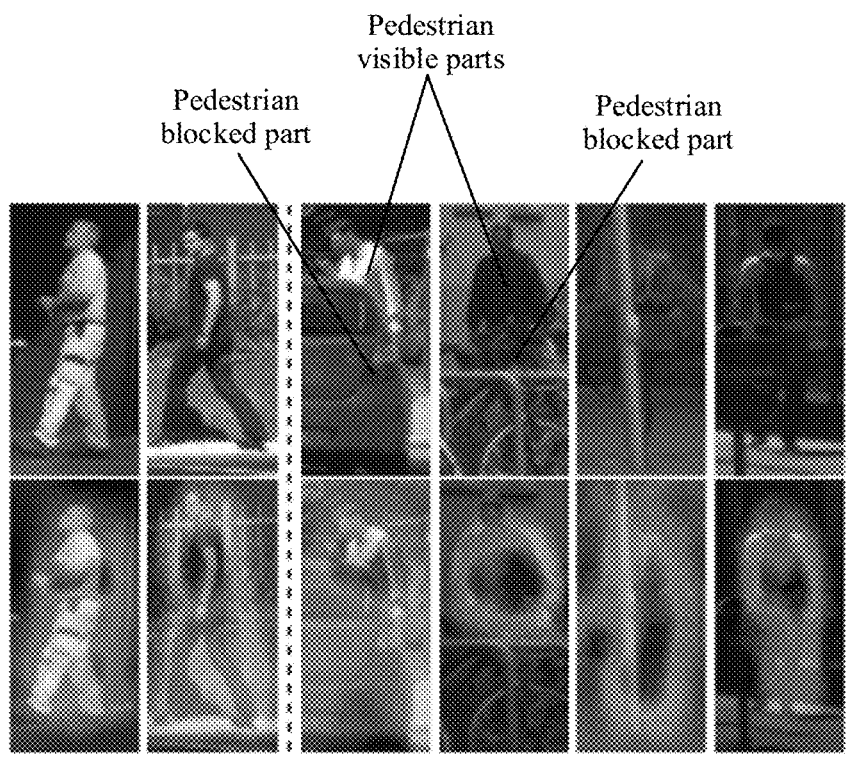
FIG. 15 is a schematic diagram of an object visibility map.

The following describes a display effect of the object visibility map with reference to FIG. 14 and FIG. 15.

As shown in FIG. 14, a human body visible part is a part in which a pedestrian can be seen, or in other words, a part in which the pedestrian is not blocked by another object. A pedestrian invisible part may include another object part that blocks the pedestrian and a background part of an image. In FIG. 14, a color of the human body visible part is relatively bright, indicating that a response is relatively strong, and a color of the human body invisible part is relatively dark, indicating that a response is relatively weak.

As shown in FIG. 15, six images in the first row are original images, and six images in the second row are corresponding object visibility maps. In the six images shown in the second row, a color of a human body visible part is also relatively bright, and a color of a pedestrian invisible part is still relatively dark. In images in both the third column and the fourth column shown in FIG. 15, a lower part of a human body is blocked, and in a generated object visibility map, brightness of a color corresponding to a human body visible part is greater than brightness of a color corresponding to a human body blocked part, so that a feature of the human body visible part is enhanced, and a feature of the human body blocked part and a feature of a background region are weakened.

With the object visibility map of the image, the feature of the pedestrian visible part can be highlighted.

In addition, in the object visibility map of the image, the pedestrian visible part is a part in which a pedestrian image can be seen, and the pedestrian invisible part is a part in which no pedestrian image can be seen.

Because the object visibility map in the image has a stronger response to the pedestrian visible part, when a bounding box including a pedestrian is subsequently determined in the image, accuracy of pedestrian detection can be improved in combination with the object visibility map.

In step 1004, to obtain the object visibility map of the image, convolution processing may be first performed on the basic feature map of the image, and then weighted summation processing is performed on a plurality of feature maps obtained through the convolution processing, to obtain the object visibility map of the image.

In this application, because the object visibility map of the image can highlight the feature of the pedestrian visible part, the enhanced feature map obtained by fusing the basic feature map of the image and the object visibility map of the image highlights the feature of the pedestrian visible part, thereby improving accuracy of pedestrian detection subsequently performed based on the enhanced feature map.

Optionally, in the object visibility map of the image, the pedestrian invisible part includes a pedestrian blocked part.

When the pedestrian invisible part includes the pedestrian blocked part, the pedestrian visible part and the pedestrian blocked part can be distinguished in the object visibility map. In addition, because the pixel value of the pedestrian visible part is greater than a pixel value of the pedestrian blocked part, in the object visibility, the feature of the pedestrian visible part can be highlighted, and a feature of the pedestrian blocked part can be weakened, to reduce impact of the pedestrian blocked part on a detection result in a subsequent pedestrian detection process, so that the feature of the pedestrian visible part is highlighted, thereby improving an effect of pedestrian detection.

Optionally, in the object visibility map of the image, the pedestrian invisible part includes a background part of the image.

The background part of the image may be another part other than a pedestrian in the image, or the background part of the image may be another part other than a pedestrian and a main object (for example, a car) in the image.

When the pedestrian invisible part includes the background part of the image, the pedestrian and the background part can be distinguished in the object visibility map, to highlight the feature of the pedestrian visible part, and weaken a feature of the background part, to reduce impact of the background part on a detection result in a subsequent pedestrian detection process, so that the feature of the pedestrian visible part is highlighted during subsequent pedestrian detection, thereby improving an effect of pedestrian detection.

Figure 16:
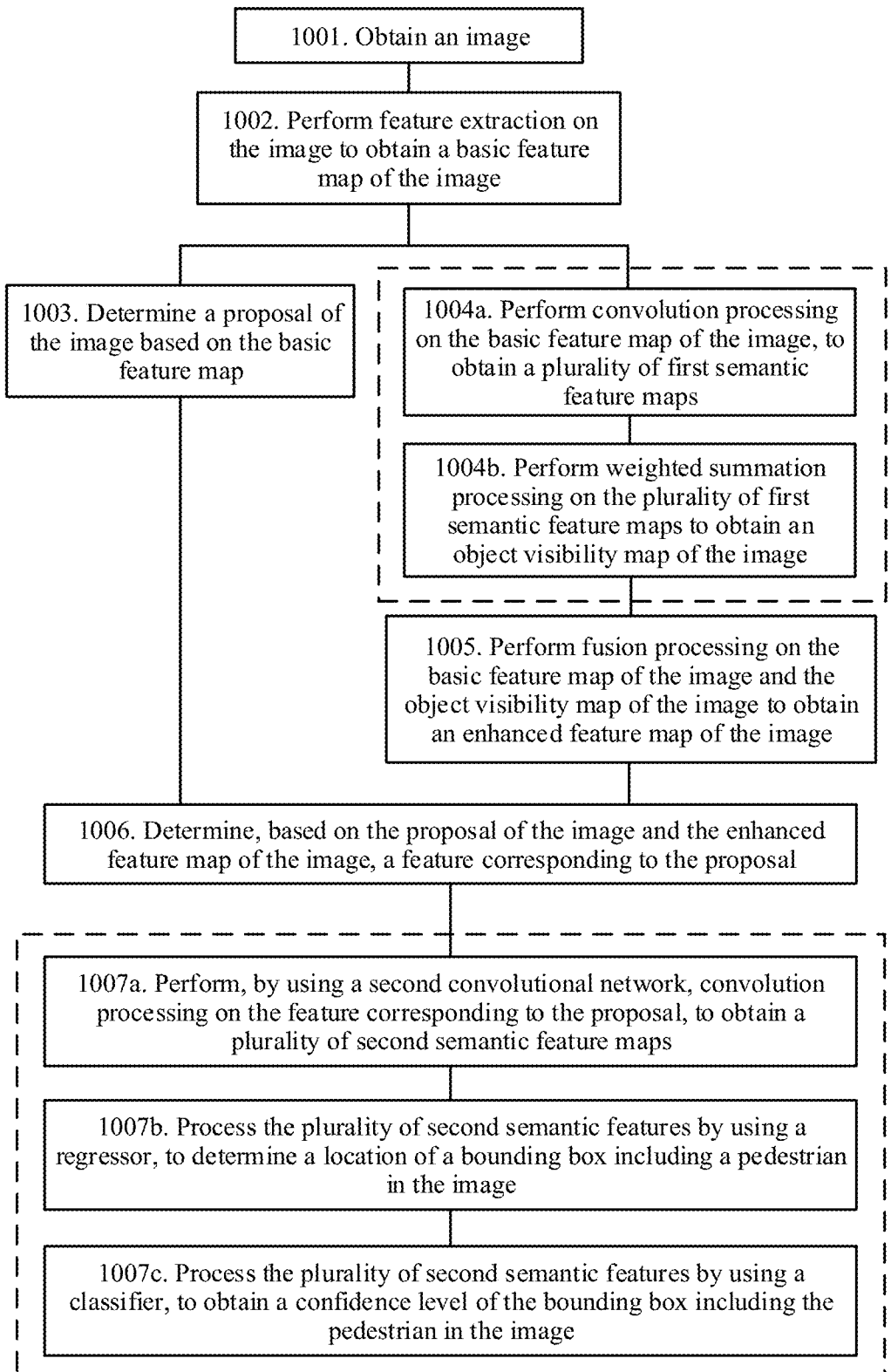
FIG. 16 is a schematic flowchart of a pedestrian detection method according to an embodiment of this application.

As shown in FIG. 16, a specific process of determining the object visibility map of the image in step 1004 may include the following steps:

1004*a*. Perform convolution processing on the basic feature map of the image by using a first convolutional network, to obtain a plurality of first semantic feature maps.

1004*b*. Perform weighted summation processing on the plurality of first semantic feature maps to obtain the object visibility map of the image.

The plurality of first semantic feature maps are a plurality of feature maps that have different semantic meanings and that are extracted from a full map of the basic feature map. Specifically, any two of the plurality of first semantic feature maps correspond to different semantic meanings.

For example, the plurality of first semantic feature maps include $F_1$, $F_2$, and $F_3$, $F_1$ reflects a feature of a head, $F_2$ reflects a feature of a left hand, $F_3$ reflects a feature of a right hand, and semantic meanings reflected respectively by $F_1$, $F_2$, and $F_3$ are different from each other.

A convolution parameter used when the convolution processing is performed in step 1004*a* is the same as a convolution parameter used when convolution processing is performed in subsequent step 1007*a*. A weighting coefficient used when the weighted summation processing is performed on the plurality of first semantic features in step 1004*b* is a weight coefficient that is in a classifier and that is used to determine a pedestrian score. The classifier is the classifier in the RCNN module 106 in FIG. 8A.

Because the convolution parameter in step 1004*a* is the same as the convolution parameter in step 1007*a*, and the weighting coefficient used when the weighted summation processing is performed on the plurality of first semantic features in step 1004*a* is the weight coefficient that is in the classifier and that is used to determine a pedestrian score, the object visibility map obtained in step 1004*b* may have a response to the pedestrian visible part stronger than a response to the pedestrian invisible part.

In step 1004*a* and step 1004*b*, a self-activation module may process the basic feature map to obtain the object visibility map of the image.

Figure 17:
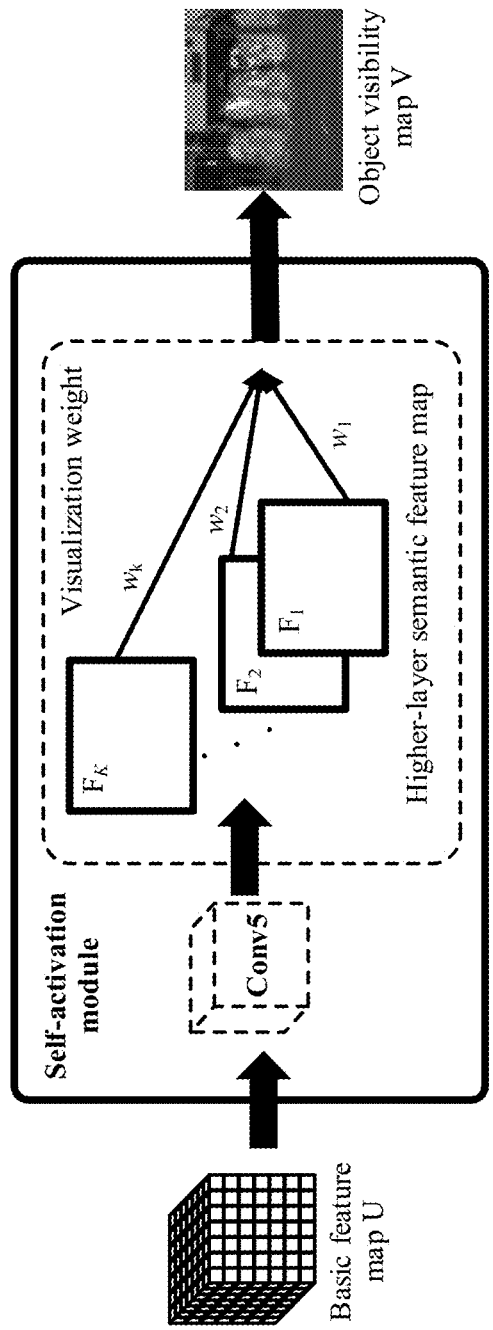
FIG. 17 is a schematic diagram of a process in which a self-activation module obtains an object visibility map based on a basic feature map.

The following describes step 1004*a* and step 1004*b* in detail with reference to FIG. 17.

As shown in FIG. 17, further convolution processing may be first performed on the basic feature map $U \in H^*W^*K$ by using a Conv5 convolutional layer, to obtain a higher-layer semantic feature map $F \in H^*W^*K$. H, W, and K are respectively a height, a width, and a quantity of channels of the higher-layer semantic feature map. A higher-layer semantic feature can reflect a feature of some key parts of a person (for example, a feature of a head, a feature of a left hand, or a feature of a right hand).

Then, the higher-layer semantic feature map F may be further divided into K first feature maps $F_k \in H^*W$, and k=1, 2, . . . , K. Each first feature map reflects a different feature. For example, $F_1$ reflects a feature of a head, $F_2$ reflects a feature of a left hand, $F_3$ reflects a feature of a background object . . . . Features of different parts are of different importance during pedestrian recognition. Some features are of high importance during pedestrian recognition, and some features are of low importance during pedestrian recognition. For example, the feature of the head and a feature of a face are of relatively high importance during pedestrian recognition, and the feature of the background object is of relatively low importance during pedestrian recognition.

In addition, a convolution parameter of the Conv5 convolutional layer in the self-activation module is the same as a convolution parameter of a Conv5 convolutional layer in an RCNN module shown in FIG. 24 below. The convolution parameter of the Conv5 convolutional layer in the RCNN module is generally obtained through a plurality of times of training before pedestrian detection. Therefore, when the Conv5 convolutional layer in the self-activation module uses the convolution parameter the same as that of the Conv5 convolutional layer in the RCNN module, a higher-layer semantic feature of the image can be better extracted. In addition, because a weight of the classifier establishes a mapping relationship between a feature and a category after the Conv5 convolutional layer, to reuse the weight of the classifier (the RCNN module 106 in FIG. 8A), the self-activation module needs to perform same encoding. Therefore, the Conv5 convolutional layer is used herein.

After the plurality of first feature maps ($F_1$ to $F_k$) are obtained, weighted summation may be performed on the plurality of first feature maps based on a formula (2) to obtain the visibility map of the image:

$$V = \sum_{k=1}^{K} w_k F_k \in H * W \qquad (2)$$

In the formula (2), $w_k \in 1*1$ represents the weight coefficient of the first feature map $F_k \in H*W$. Larger $w_k$ indicates that $F_k$ makes a greater contribution to pedestrian recognition and $F_k$ is of higher importance.

When the object visibility map of the image is computed based on the formula (2), a used weight coefficient (the weight coefficient herein may also be referred to as a visualization weight) is the same as a weight coefficient subsequently used when weighted summation is performed on feature maps with different semantic meanings in the RCNN module. Specifically, the weight coefficient of the first feature map $F_k \in H*W$ is the same as a weight coefficient subsequently used when the RCNN module superposes feature maps with same semantic meanings. For example, a weight coefficient of a first feature map that represents a head of a person in the formula (2) is the same as a weight coefficient subsequently used when the RCNN module performs weighted summation on a feature map that represents a head of a person.

In the weighted summation manner in the formula (2), a feature that makes a great contribution to human body detection may be highlighted, and a feature that makes a small contribution to human body detection may be suppressed. It is found in an experiment that the object visibility map V that is of the image and that is obtained through computing by using the formula (2) can generate a strong response to the pedestrian visible part, and generate a weak response to the background and the blocked part.

The object visibility map that is of the image and that is generated through computing by using the formula (2) may be shown in FIG. 14 and FIG. 15. In images shown in FIG. 14 and FIG. 15, a color of a person is relatively bright, indicating a relatively large strong, and a color of another object or background around the person is relatively dark, indicating a weaker response. In general, the object visibility maps of the images shown in FIG. 14 and FIG. 15 have a strong suppression effect on the background. Locally, a response to a pedestrian visible part is strong, and a response to a pedestrian blocked part is weak.

In this application, when the object visibility map of the image is obtained by performing weighted summation on the plurality of first feature maps by using a weighting coefficient the same as that used by the RCNN module to perform weighted summation processing, a feature that makes a great contribution to pedestrian detection can be highlighted, and a feature that makes a small contribution can be suppressed.

1005. Perform fusion processing on the basic feature map of the image and the object visibility map of the image to obtain an enhanced feature map of the image.

Before the fusion processing is performed on the basic feature map of the image and the object visibility map of the image, dimension extension may be first performed on the object visibility map of the image, so that a quantity of channels of an object visibility map obtained after the dimension extension is the same as a quantity of channels of the basic feature map. Then, the fusion processing is performed on the basic feature map of the image and the object visibility map of the image. During the fusion processing, the following three fusion manners may be specifically used.

First Fusion Manner:

In the first fusion manner, a corresponding element in the basic feature map may be multiplied by a corresponding element in the object visibility map obtained after the dimension extension, and then an obtained product and the corresponding element in the original basic feature map are summed up, to obtain a value of a corresponding element in the enhanced feature map $\tilde{U}$.

Figure 18:
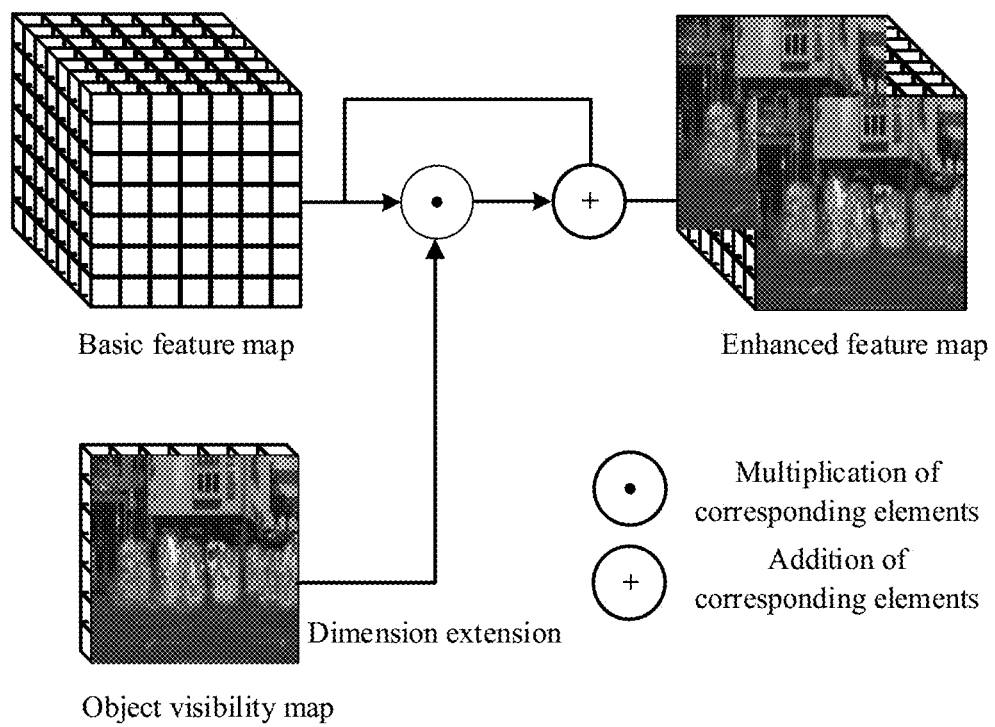
FIG. 18 is a schematic diagram of a process of performing weighted summation on an object visibility map and a basic feature map.

Specifically, as shown in FIG. 18, an object visibility map V generally has only one channel before dimension extension is performed. Through the dimension extension, a quantity of channels of an object visibility map V obtained after the dimension extension is the same as a quantity of channels of a basic feature map U. Then, an element (i, j) in the basic feature map U is multiplied by an element (i, j) in the object visibility map V obtained after the dimension extension, and a product and a value of the element (i, j) in the basic feature map U are summed up, to obtain a value of each element in an enhanced feature map $\tilde{U}$.

It should be understood that in the process shown in FIG. 18, weighted summation may be performed on the feature map channel by channel, to finally obtain an enhanced feature map whose quantity of channels is the same as that of the basic feature map. For example, the basic feature map U has 64 channels in total. In this case, an element in a feature map of each channel of the basic feature map may be multiplied by a corresponding element in the object visibility map, and then a multiplication result and the corresponding element in the basic feature map are summed up, to obtain a value of a corresponding element in the enhanced feature map. A similar operation is repeated until a value of an element in a feature map of each of 64 channels of the enhanced feature map is obtained.

Specifically, during weighting processing, a formula (3) may be used to perform the weighting processing on the object visibility map V of the image and the basic feature map U of the image, to obtain the enhanced feature map $\tilde{U}$ of the image.

$$\tilde{U} = U \odot \tilde{V} + U \in H * W * K \qquad (3)$$

In the formula (3), $\tilde{V} = [V, V, \ldots, V] \in H*W*K$ means that V is extended K times in a dimension of a channel, $\odot$ and means multiplication of corresponding elements.

The enhanced feature map that is of the image and that is obtained by using the self-activation module 103 can enhance a feature of a human body visible part in the image, and suppress a feature of background and a feature of an obstruction, thereby facilitating high-precision pedestrian detection subsequently performed based on an enhanced image feature of the image.

Second Fusion Manner:

In the second fusion manner, a corresponding element in the basic feature map may be multiplied by a corresponding element in the object visibility map obtained after the dimension extension, and then an obtained product and the corresponding element in the object visibility map obtained after the dimension extension are summed up, to obtain a value of a corresponding element in the enhanced feature map $\hat{U}$.

Third Fusion Manner:

In the third fusion manner, weighted summation may be directly performed on a corresponding element in the basic feature map and a corresponding element in the object visibility map obtained after the dimension extension, and a value of an element obtained after the weighted summation is a value of a corresponding element in the enhanced feature map. When the weighted summation is performed, a weighting coefficient of the object visibility map obtained after the dimension extension may be greater than a weighting coefficient of the basic feature map, so that the enhanced feature map mainly reflects a feature of the object visibility map.

1006. Determine, based on the proposal of the image and the enhanced feature map of the image, a feature corresponding to the proposal.

The feature that corresponds to the proposal and that is obtained in step 1006 may include a region feature of the proposal. The region feature of the proposal is a feature of a region that is in the enhanced feature map and that is located in the proposal.

Specifically, the region feature of the proposal may be a feature in a region that is in the enhanced feature map and that corresponds to the proposal. When the region feature of the proposal is determined, a location of the proposal in the enhanced feature map may be first determined, and then, a feature in a region that is in the enhanced feature map and that is bounded by the proposal may be determined as the region feature of the proposal.

Further, sampling processing (which may be specifically upsampling or downsampling) may be further performed on the feature of the region that is in the enhanced feature map and that is bounded by the proposal, to obtain the region feature of the proposal.

The feature corresponding to the proposal may further include a feature of another region outside the proposal, in addition to the region feature of the proposal.

Figure 19:
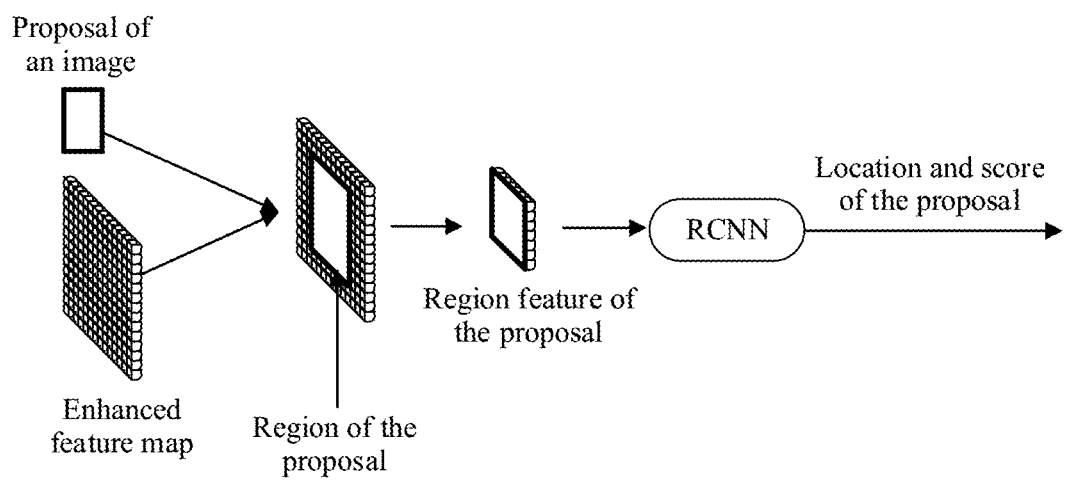
FIG. 19 is a schematic diagram of a process of obtaining a pedestrian detection result based on a proposal and an enhanced feature map.

As shown in FIG. 19, based on a proposal (a location of the proposal) of the image, a feature that is in the enhanced feature map of the image and that is located in the proposal may be directly used as a feature corresponding to the proposal.

To make a final determined feature corresponding to a proposal more accurate, a region of the proposal may be first determined with reference to the object visibility map of the image, and then a feature corresponding to the proposal is determined based on the region of the proposal of the image and the enhanced feature map of the image.

Figure 20:
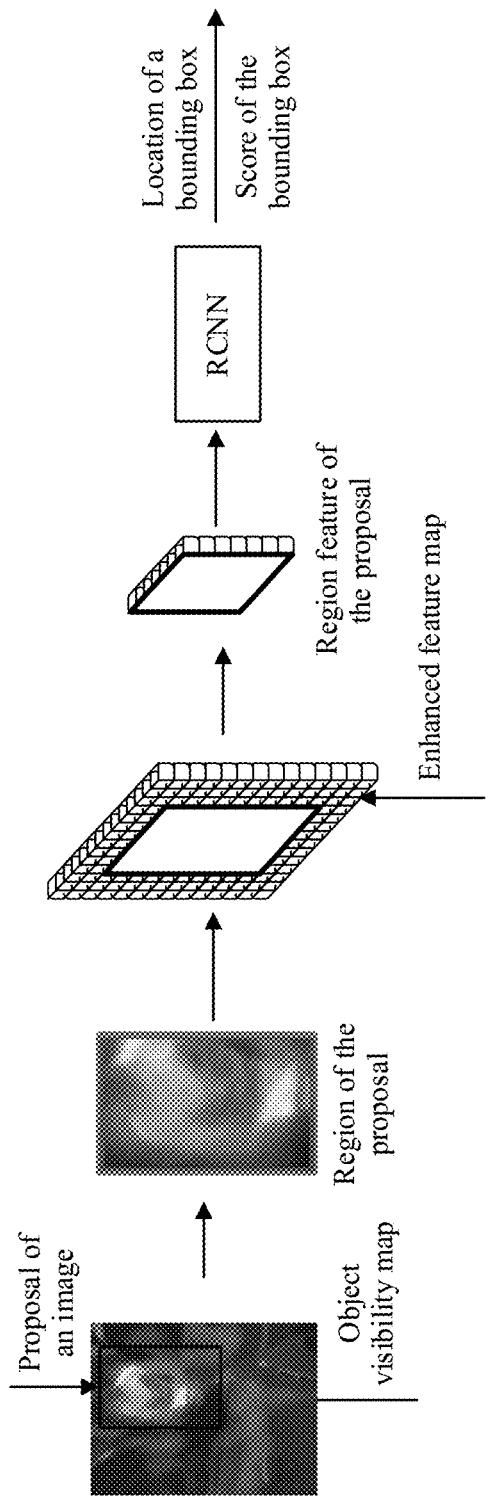
FIG. 20 is a schematic diagram of a process of obtaining a pedestrian detection result based on an object visibility map, a proposal, and an enhanced feature map.

As shown in FIG. 20, based on a proposal (a location of the proposal) of the image, a region of the proposal may be first determined from the object visibility map of the image, and then based on the region (a location of the region) of the proposal, a feature that is in the enhanced feature map and that is located in the proposal is determined as a feature corresponding to the proposal.

In FIG. 20, because the object visibility map of the image has a stronger response to a human body visible part, the location of the proposal can be more accurately determined by using the object visibility map, to subsequently obtain a more accurate region feature of the proposal.

In FIG. 19 and FIG. 20, after the region feature of the proposal is obtained, the RCNN module may be used to continue to process the region feature of the proposal, to finally obtain a bounding box including a pedestrian in the image and a confidence level of the bounding box including the pedestrian in the image.

In this application, to further improve accuracy of a final pedestrian detection result, a region feature of a region around the proposal may be extracted, the region feature of the region around the proposal is fused with the region feature of the proposal, and then a fused feature is processed by using the RCNN module, to determine the bounding box including the pedestrian in the image and the confidence level of the bounding box including the pedestrian in the image. In this application, because the region feature of the proposal and the region feature of the region around the proposal are comprehensively used to comprehensively determine the bounding box including the pedestrian in the image and the confidence level of the bounding box including the pedestrian in the image, accuracy of pedestrian detection is higher.

Optionally, the feature corresponding to the proposal further includes a region feature of a contour region of the proposal, and the contour region of the proposal is a region formed between the proposal and a scaled-down proposal obtained after the proposal is scaled down by a first preset proportion.

The region feature of the contour region of the proposal generally includes a contour feature of a pedestrian, and the contour feature of the pedestrian plays a very important role in pedestrian detection.

Figure 21:
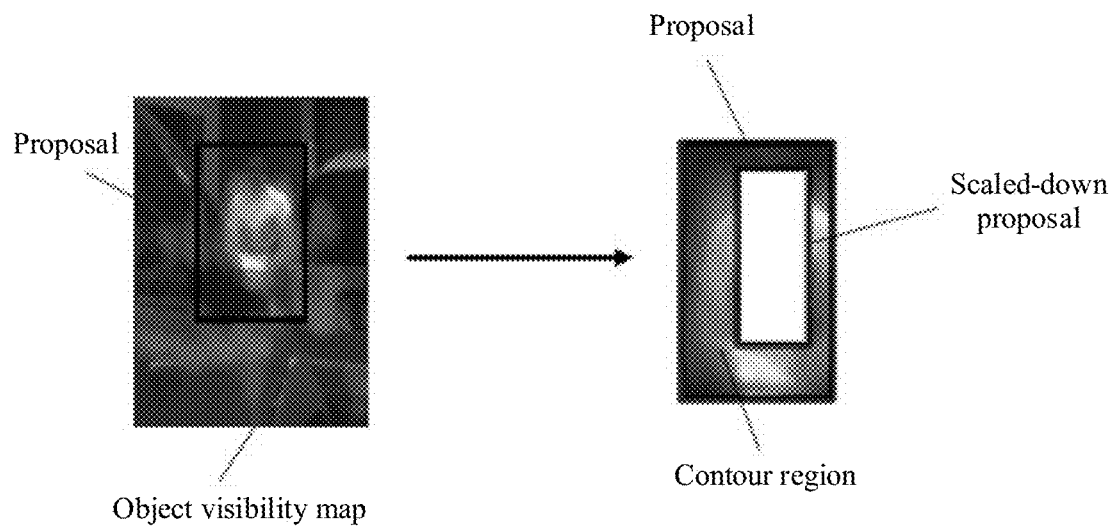
FIG. 21 is a schematic diagram of determining a contour region of a proposal.

As shown in FIG. 21, based on a proposal (a location of the proposal) of the image, a region of the proposal is first determined from the object visibility map of the image, and then a frame of the proposal is scaled down inwards at a specific proportion. A region between the original frame of the proposal and a frame obtained after the proposal is scaled down is a contour region of the proposal.

Alternatively, when a contour region of a proposal is determined, a region of the proposal may be determined from the enhanced feature map, and then a frame of the proposal is scaled down inwards at a specific proportion. A region between the original frame of the proposal and a frame obtained after the proposal is scaled down is the contour region of the proposal.

That the proposal is scaled down by a first preset proportion may specifically mean that a width and a height of the proposal are respectively scaled down by specific proportions, and the proportions at which the width and the height of the proposal are scaled down may be the same or may be different.

Optionally, that the proposal is scaled down by a first preset proportion includes: the width of the proposal is scaled down by a first scale-down proportion, and the height of the proposal is scaled down by a second scale-down proportion.

The first preset proportion includes the first scale-down proportion and the second scale-down proportion, and the first scale-down proportion and the second scale-down proportion may be the same or may be different.

The first scale-down proportion and the second scale-down proportion may be set based on experience. For example, proper values may be set for the first scale-down proportion and the second scale-down proportion, so that a contour feature of a pedestrian can be better extracted from the contour region that is of the proposal and that is obtained after the width and the height of the proposal are scaled down by the first scale-down proportion and the second scale-down proportion.

The first scale-down proportion and the second scale-down proportion may be set to values that can be used to better extract a pedestrian contour.

The first scale-down proportion may be 1/1.1, and the second scale-down proportion may be 1/1.8.

The frame of the proposal may be scaled down inwards at a specific proportion by using a center of the proposal as a center. A center of a scaled-down proposal may be a maximum value point of the original proposal in the object visibility map of the image.

Optionally, the center of the scaled-down proposal is consistent with the center of the original proposal.

In this application, when the feature corresponding to the proposal further includes the region feature of the contour region of the proposal, the contour feature of the pedestrian can also be considered during pedestrian detection, so that pedestrian detection can be better performed subsequently in combination with the contour feature of the pedestrian.

Optionally, the method shown in FIG. 10 further includes: setting a value of a feature that is of the region feature of the proposal and that is located in the scaled-down proposal to zero, to obtain the region feature of the contour region of the proposal.

In this application, when the region feature of the contour region of the proposal is obtained, the value of the feature that is of the region feature of the proposal and that is located in the scaled-down proposal is directly set to zero, so that the region feature of the contour region of the proposal can be quickly and conveniently obtained.

It should be understood that in this application, the region feature of the contour region of the proposal may alternatively be obtained in another manner. For example, the region feature of the contour region of the proposal may be directly obtained from the enhanced feature map through scanning based on a region location of the contour region of the proposal.

Optionally, the feature corresponding to the proposal further includes a region feature of a background region of the proposal, and the background region of the proposal is a region formed between the proposal and a scaled-up proposal obtained after the proposal is scaled up by a second preset proportion.

The region feature of the background region of the proposal generally reflects a feature of a background region in which a pedestrian in the image is located. Pedestrian detection may be performed based on the feature of the background region and a feature of the pedestrian.

That the proposal is scaled up by a second preset proportion may specifically mean that the width and the height of the proposal are respectively scaled up by specific proportions, and the proportions at which the width and the height of the proposal are scaled up may be the same or may be different.

Optionally, that the proposal is scaled up by a second preset proportion includes: the width of the proposal is scaled up by a first scale-up proportion, and the height of the proposal is scaled up by a second scale-up proportion.

The second preset proportion includes the first scale-up proportion and the second scale-up proportion, and the first scale-up proportion and the second scale-up proportion may be the same or may be different.

The first scale-up proportion and the second scale-up proportion may be set based on experience. For example, proper values may be set for the first scale-up proportion and the second scale-up proportion, so that a contour feature of a pedestrian can be better extracted from the contour region that is of the proposal and that is obtained after the width and the height of the proposal are scaled up by the first scale-up proportion and the second scale-up proportion.

The first scale-up proportion and the second scale-up proportion may be set to values that can be used to better extract a pedestrian contour.

The first scale-up proportion may be 1/1.1, and the second scale-up proportion may be 1/1.8.

Figure 22:
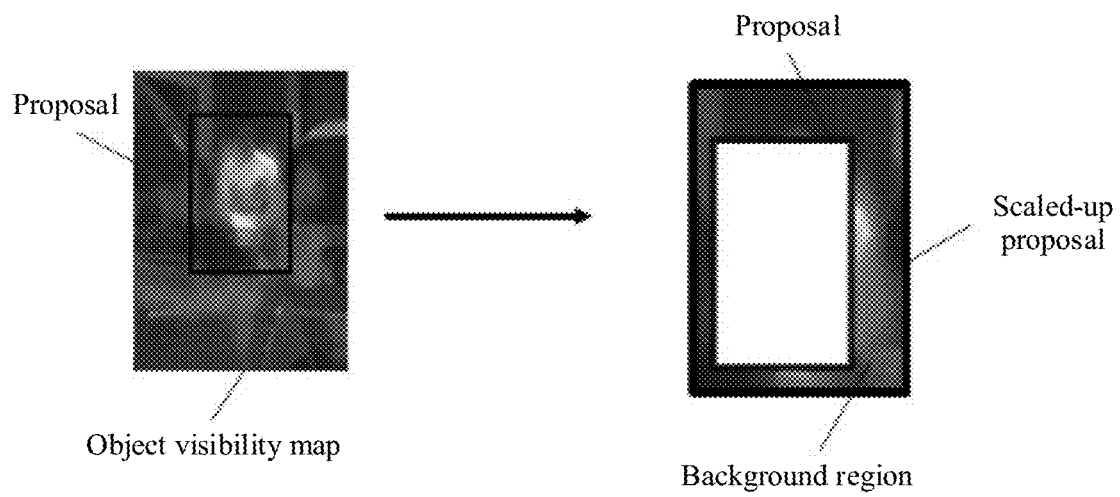
FIG. 22 is a schematic diagram of determining a background region of a proposal.

As shown in FIG. 22, based on a proposal (a location of the proposal) of the image, a region of the proposal is first determined from the object visibility map of the image, and then a frame of the proposal is scaled up outwards at a specific proportion. A region between the original frame of the proposal and a frame obtained after the proposal is scaled up is a background region of the proposal.

Alternatively, when a background region of a proposal is determined, a region of the proposal may be first determined from the enhanced feature map of the image based on the proposal (a location of the proposal) of the image, and then a frame of the proposal is scaled up outwards at a specific proportion. A region between the original frame of the proposal and a frame obtained after the proposal is scaled up is the background region of the proposal.

When the frame of the proposal is scaled up, the scale-up proportions may be determined based on experience. For example, when the proposal is scaled up, a width of the proposal may be changed to 1.1 times of an original width, and a height of the proposal may be changed to 1.8 times of an original height.

The frame of the proposal may be scaled up outwards at a specific proportion by using a center of the proposal as a center. A center of a scaled-up proposal may be a maximum value point of the original proposal in the object visibility map of the image.

Optionally, the center of the scaled-up proposal is consistent with the center of the original proposal.

In this application, when the feature corresponding to the proposal further includes the region feature of the background region of the proposal, the region feature of the background region can also be considered during pedestrian detection, so that pedestrian detection can be better performed subsequently in combination with the region feature of the background region.

Optionally, the method shown in FIG. 10 further includes: obtaining a region feature of a first region, where the region feature of the first region is a region feature in a region that is in the object visibility map and that is located in the scaled-up proposal; and setting a feature that is of the region feature of the first region and that is located in the proposal to zero, to obtain the region feature of the background region of the proposal.

Optionally, the region feature of the background region of the proposal may alternatively be determined with reference to the enhanced feature map. Specifically, a region feature of a second region may be obtained, where the region feature of the second region is a region feature of a region that is in the enhanced feature map and that is located in the scaled-up proposal; and a feature that is of the region feature of the second region and that is located in the proposal is set to zero, to obtain the region feature of the background region of the proposal.

In this application, when the region feature of the background region of the proposal is obtained, a region feature that is in the enhanced feature map and that corresponds to the background region of the proposal is obtained, and then a feature that is of the region feature and that is located in the proposal is directly set to zero, so that the region feature of the background region of the proposal can be quickly and conveniently obtained.

It should be understood that the region feature of the proposal, the contour feature of the proposal, and the background feature of the proposal herein may be referred to as features corresponding to the proposal. In other words, in this case, the feature corresponding to the proposal not only includes a region feature in a region of the proposal, but also includes a region feature of another region (a contour region and a background region) outside the region of the proposal.

Specifically, in addition to the region feature of the proposal, the feature corresponding to the proposal may further include at least one of the contour feature of the proposal and the background feature of the proposal.

When the feature corresponding to the proposal includes the three features: the region feature of the proposal, the contour feature of the proposal, and the background feature of the proposal, the feature corresponding to the proposal includes most information, so that when pedestrian detection is subsequently performed, based on the RCNN module, on the feature corresponding to the proposal, accuracy of pedestrian detection can be improved to some extent.

It should be understood that the feature corresponding to the proposal may directly include the three independent features: the region feature of the proposal, the contour feature of the proposal, and the background feature of the proposal, or may include a feature obtained after the three features, namely, the region feature of the proposal, the contour feature of the proposal, and the background feature of the proposal, are fused. In other words, the three features, namely, the region feature of the proposal, the contour feature of the proposal, and the background feature of the proposal, may be fused, and a fused feature is the feature corresponding to the proposal.

A process of obtaining a feature corresponding to a proposal and performing pedestrian detection based on the feature corresponding to the proposal is described in detail below with reference to FIG. 23 by using an example in which the feature corresponding to the proposal is a feature obtained after three features, namely, a region feature of the proposal, a contour feature of the proposal, and a background feature of the proposal are fused.

Figure 23:
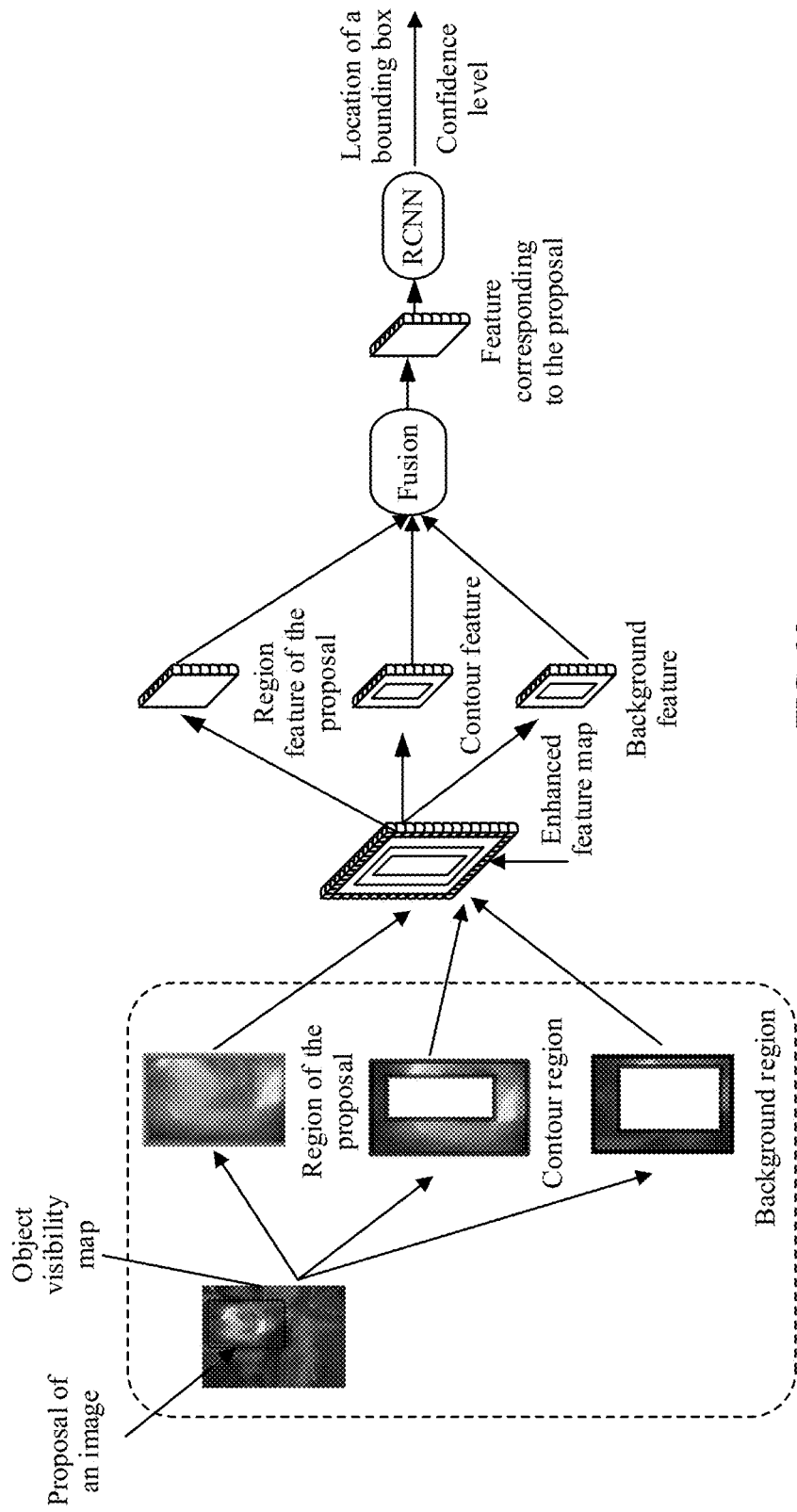
FIG. 23 is a schematic diagram of a process of obtaining a pedestrian detection result based on an object visibility map, a proposal, and an enhanced feature map.

As shown in FIG. 23, based on a proposal of the image and the object visibility map of the image, a region of the proposal, a contour region of the proposal, and a background region of the proposal may be determined (for a process of determining these regions, refer to FIG. 21 and FIG. 22).

Then, a region feature of the proposal, a region feature of the contour region (which may be referred to as a contour feature for short) of the proposal, and a region feature of the background region (which may be referred to as a background feature for short) of the proposal are respectively extracted from the enhanced feature map of the image based on the region of the proposal, the contour region of the proposal, and the background region of the proposal.

After the region feature of the proposal, the region feature of the contour region of the proposal, and the region feature of the background region of the proposal are obtained, the three features may be fused to obtain a fused feature. The fused feature is a feature corresponding to the proposal. The three features may be fused in a linear combination manner (weighted summation is performed on the three features), or may be fused in a non-linear combination manner. Before the three features are fused, the three features may be first adjusted to a same size (for example, 7*7*K, where K is a quantity of channels). Then the three features are fused.

After the feature corresponding to the proposal is obtained, the RCNN module may be used to process the feature corresponding to the proposal, to finally obtain a bounding box including a pedestrian in the image and a confidence level of the bounding box including the pedestrian in the image.

1007. Determine, based on the feature corresponding to the proposal, a bounding box including a pedestrian in the image and a confidence level of the bounding box including the pedestrian in the image.

By performing convolution processing and weighted summation on the feature corresponding to the proposal, the bounding box including the pedestrian in the image and the confidence level of the bounding box including the pedestrian in the image can be better determined based on an image feature of a part corresponding to the proposal.

In this application, because the object visibility map of the image can highlight the feature of the pedestrian visible part, the enhanced feature map obtained by fusing the basic feature map of the image and the object visibility map of the image highlights the feature of the pedestrian visible part, thereby improving accuracy of pedestrian detection subsequently performed based on the enhanced feature map. In addition, when a pedestrian is blocked (relatively severely), accuracy of pedestrian detection in this application is relatively significantly improved.

In addition, in this application, when accuracy of pedestrian detection is improved by using the object visibility map, a marking amount of training data is not increased in a training process. In this application, there are only needs to generate the object visibility map in a processing process and comprehensively consider the object visibility map in subsequent processing. Compared with a solution in which accuracy of pedestrian detection is improved by increasing a data marking amount, this application can reduce a data marking amount and reduce training complexity.

The pedestrian detection method in this embodiment of this application may be applied to a plurality of scenarios such as a driver assistance/automated driving system and a Safe City/video surveillance system.

When the pedestrian detection method in this embodiment of this application is applied to the driver assistance/automated driving system, a road picture is obtained, a bounding box including a pedestrian in the road picture and a confidence level of the bounding box including the pedestrian in the road picture can be detected through processing by using the pedestrian detection method in this embodiment of this application. Then, a self-driving vehicle may be controlled based on the bounding box including the pedestrian in the road picture and the confidence level of the bounding box including the pedestrian in the road picture. For example, when it is determined, based on the bounding box including the pedestrian in the road picture and the confidence level of the bounding box including the pedestrian in the road picture, that there is probably a pedestrian in front of the vehicle, the vehicle may be controlled to decelerate and whistle, or the vehicle may be controlled to bypass the pedestrian.

When the pedestrian detection method in this embodiment of this application is applied to the Safe City/video surveillance system, a surveillance picture may be first obtained, and then a bounding box including a pedestrian in the surveillance picture and a confidence level of the bounding box including the pedestrian in the surveillance picture are obtained through processing by using the pedestrian detection method in this embodiment of this application. Then, a particular person may be recognized and tracked based on the bounding box including the pedestrian in the surveillance picture and the confidence level of the bounding box including the pedestrian in the surveillance picture. For example, when it is recognized, based on the bounding box including the pedestrian in the surveillance picture and the confidence level of the bounding box including the pedestrian in the surveillance picture, that there is a particular person (a missing person or a criminal suspect) in the surveillance picture, the particular person may be tracked through a Sky Eye system (the system may be considered as a part of the Safe City/video surveillance system).

In step 1007, the convolution processing may be first performed on the feature corresponding to the proposal, then the weighted summation is performed on convolutional feature maps obtained after the convolution processing, and finally, the bounding box including the pedestrian in the image and the confidence level of the bounding box including the pedestrian in the image are determined based on a feature map obtained through the weighted summation.

Specifically, as shown in FIG. 16, a specific process of determining a bounding box including a pedestrian in the image and a confidence level of the bounding box including the pedestrian in the image in step 1007 may include the following steps:

1007a. Perform, by using a second convolutional network, convolution processing on the feature corresponding to the proposal, to obtain a plurality of second semantic feature maps.

1007b. Process the plurality of second semantic features by using a regressor, to determine a location of the bounding box including the pedestrian in the image.

1007c. Process the plurality of second semantic features by using a classifier, to obtain the confidence level of the bounding box including the pedestrian in the image.

The plurality of second semantic feature maps represent, respectively, a plurality of feature maps that have different semantic meanings and that are extracted from the feature corresponding to the proposal. A convolution parameter of the second convolutional network is the same as a convolution parameter of the first convolutional network. Specifically, any two of the plurality of second semantic feature maps correspond to different semantic meanings.

For example, the plurality of second semantic feature maps include $F_1$, $F_2$, and $F_3$, $F_1$ reflects a feature of a head, $F_2$ reflects a feature of a left hand, $F_3$ reflects a feature of a leg, and semantic meanings reflected respectively by $F_1$, $F_2$, and $F_3$ are different from each other.

It should be understood that $F_1$, $F_2$, and $F_3$ in the example herein are different from $F_1$, $F_2$, and $F_3$ in the foregoing example description of the plurality of first semantic feature maps. $F_1$, $F_2$, and $F_3$ herein belong to the second semantic feature maps, while $F_1$, $F_2$, and $F_3$ in the foregoing example description of the plurality of first semantic feature maps belong to the first semantic feature maps.

The location of the bounding box including the pedestrian in the image and the confidence level of the bounding box including the pedestrian in the image may be a detection result of pedestrian detection performed on the image, and may be referred to as a pedestrian detection result of the image.

Figure 24:
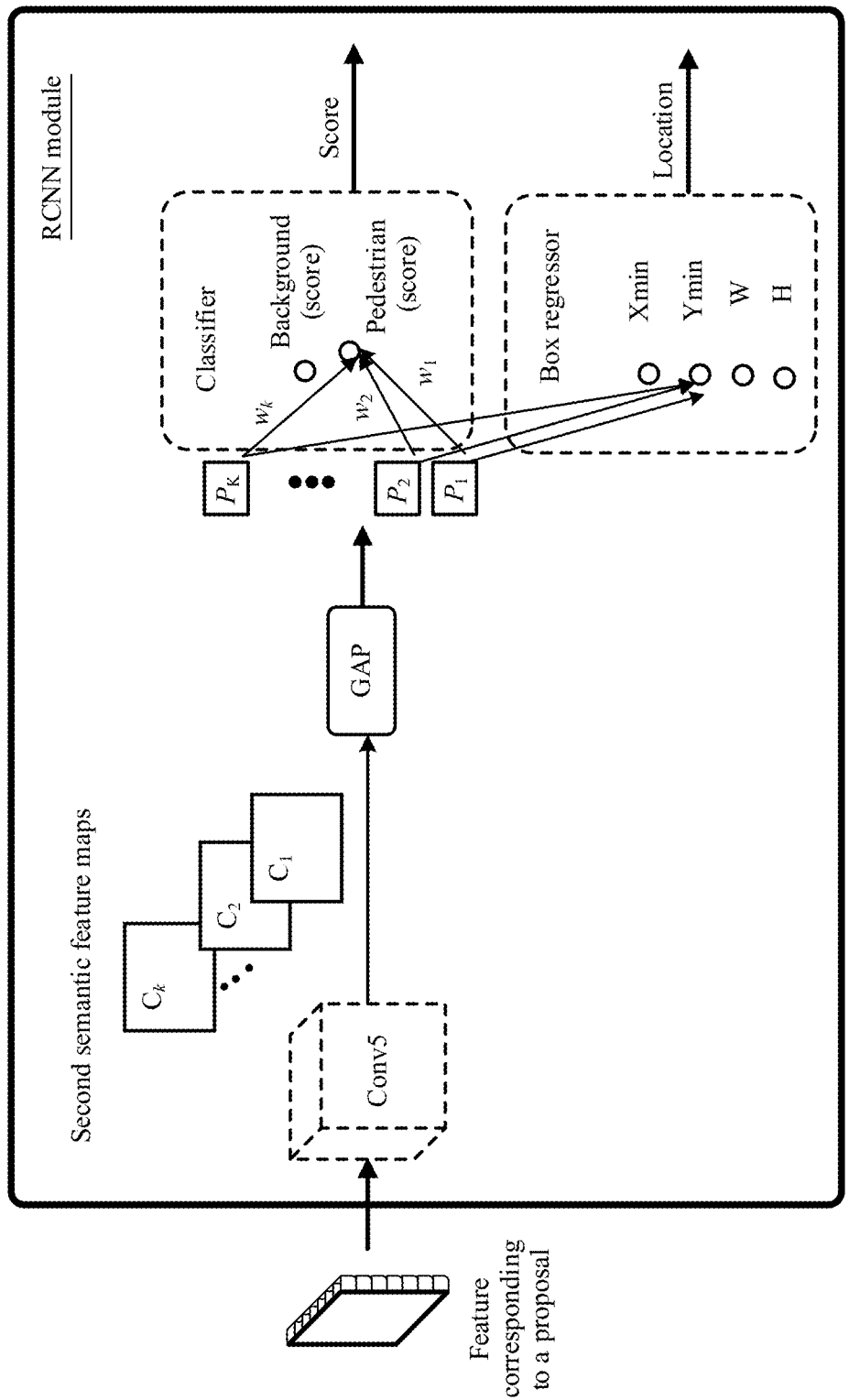
FIG. 24 is a schematic diagram in which an RCNN module processes a feature corresponding to a proposal.

The following describes a process of steps 1007a to 1007c in detail with reference to FIG. 24.

As shown in FIG. 24, convolution processing may be performed, by using Conv5 in the RCNN module, on the feature corresponding to the proposal, to obtain a plurality of second semantic feature maps ($C_1$ to $C_k$). Each of the plurality of second semantic feature maps reflects a different feature. For example, $C_1$ reflects a feature of a head, $C_2$ reflects a feature of a left hand, $C_3$ reflects a feature of a background object . . . . After the plurality of second semantic features are obtained, a global average pooling (global average pooling, GAP) module may be used to perform average processing on each second semantic feature map, to obtain feature maps $P_1$ to $P_k$. $P_1$ is obtained after averaging processing is performed on the feature map $C_1$, and $P_k$ is obtained after averaging processing is performed on the feature map $C_k$.

After the feature maps $P_1$ to $P_k$ are obtained, weighted summation may be performed on the feature maps $P_1$ to $P_k$ by using a classifier coefficient in the classifier, to obtain the confidence level of the proposal.

Specifically, weighted summation may be performed on the feature map $P_k$ based on a formula (4), to obtain the confidence level of the proposal.

$$score_{pedestrian} = \sum_{k=1}^{K} w_k P_k \qquad (4)$$

In the formula (4), $w_k \in 1*1$ is a classifier coefficient corresponding to $P_k$. In the classifier of RCNN, larger $w_k$ indicates that $P_k$ makes a greater contribution to pedestrian recognition. Because $P_k$ is an average of $C_k$, $P_k$ represents $C_k$, and larger $w_k$ indicates that $C_k$ plays a more important role in recognizing a person. Therefore, the weight coefficient in the classifier has a selection effect on $C_k$. Because of this, in the self-activation module, the classifier coefficient $w_k$ shared with RCNN is used to weight the higher-layer semantic feature map, to form the object visibility map.

Finally, in a box regressor, a similar coefficient is used to obtain more accurate coordinates (xmin, ymin, width, height) of the box.

(xmin, ymin) may be coordinates of an upper left corner position of the box. W and H represent, respectively, a width and a height of the box. In addition, (xmin, ymin) may alternatively be a center position of the box or an upper right corner position/a lower left corner position/a lower right corner position of the box.

After locations and coordinates of proposals are obtained, non-maximum suppression (non-maximize suppression, NMS) processing may be further performed on all output proposals, to combine highly overlapped proposals and filter out a proposal with an excessively low confidence level, to output a pedestrian detection result, namely, a bounding box including a pedestrian in the training image and a confidence level of the bounding box including the pedestrian in the image.

The following describes an effect of the pedestrian detection method in this embodiment of this application with reference to Table 1. Table 1 shows miss rates (miss rate)

obtained when pedestrian detection is performed on a disclosed data set (CityPersons) by using the solution of this application and existing solutions. A conventional solution 1 is an adapted faster RCNN (adapted faster RCNN) solution. The conventional solution 1 was proposed at the IEEE Conference on Computer Vision and Pattern Recognition (IEEE conference on computer vision and pattern recognition, CVPR) in 2017. IEEE is the Institute of Electrical and Electronics Engineers (institute of electrical and electronics engineers). A conventional solution 2 is an occlusion-aware R-CNN (occlusion-aware R-CNN) solution. The conventional solution 2 was proposed at the European Conference on Computer Vision (European conference on computer vision, ECCV) in 2018.

In addition, the second column in Table 1 represents loss rates of pedestrian detection performed on all pedestrians (including a pedestrian blocked by another object and a pedestrian not blocked by another object) in an image, and the third column in Table 1 represents loss rates of pedestrian detection performed on a pedestrian that is severely blocked in the image. A lower loss rate indicates better pedestrian detection performance.

It can be learned from Table 1 that loss rates of the solution of this application are lower than those of the existing solutions in both of the two scenarios, especially in the scenario with severe blockage. Compared with the conventional solutions, the solution of this application can achieve a performance gain of about 10%, and has a relatively obvious effect improvement.

TABLE 1

| Pedestrian detection method | Loss rate (all) | Loss rate (severe blockage) |
| --- | --- | --- |
| Adapted Faster RCNN (CVPR17) | 43.86 | 50.47 |
| OR-CNN (ECCV18) | 40.19 | 51.43 |
| This application | 39.26 | 41.14 |

The pedestrian detection method in the embodiments of this application is described above in detail with reference to the accompanying drawings. A pedestrian detection apparatus in the embodiments of this application is described below in detail with reference to the accompanying drawings. It should be understood that the pedestrian detection apparatus described below can perform the steps of the pedestrian detection method in the embodiments of this application. To avoid unnecessary repetition, when the pedestrian detection apparatus in the embodiments of this application is described below, repeated descriptions are properly omitted.

Figure 25:
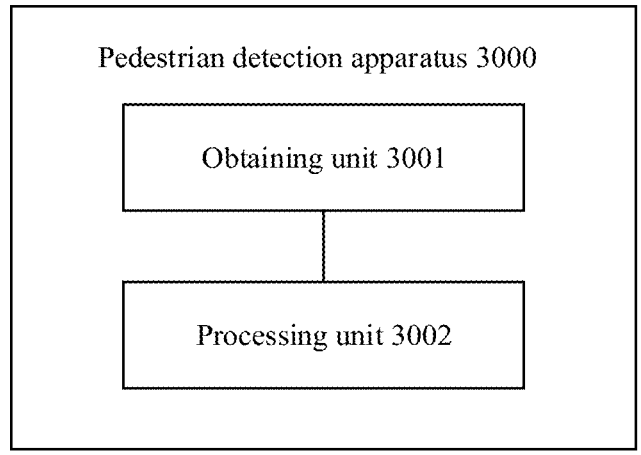
FIG. 25 is a schematic block diagram of a pedestrian detection apparatus according to an embodiment of this application.

FIG. 25 is a schematic block diagram of a pedestrian detection apparatus according to an embodiment of this application. A pedestrian detection apparatus 3000 shown in FIG. 25 includes an obtaining unit 3001 and a processing unit 3002.

The obtaining unit 3001 and the processing unit 3002 may be configured to perform the pedestrian detection method in the embodiments of this application. Specifically, the obtaining unit 3001 may perform step 1001, and the processing unit 3002 may perform steps 1002 to 1007.

The processing unit 3002 may be divided into a plurality of modules based on different processing functions. Specifically, the processing unit 3002 may be equivalent to the backbone network module 101, the RPN module 102, the self-activation module 103, the basic feature weighting module 104, the region feature generation module 105, the RCNN module 106, and the output module 107 in the pedestrian detection apparatus shown in FIG. 7. The processing unit 3002 can implement functions of the modules in the pedestrian detection apparatus shown in FIG. 7.

Figure 26:
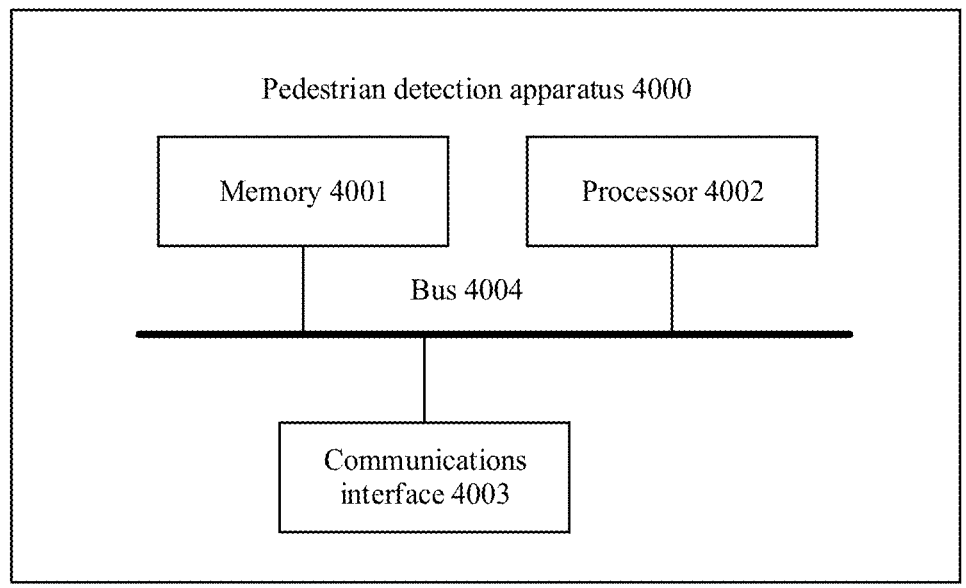
FIG. 26 is a schematic diagram of a hardware structure of a pedestrian detection apparatus according to an embodiment of this application.

FIG. 26 is a schematic diagram of a hardware structure of a pedestrian detection apparatus according to an embodiment of this application. A pedestrian detection apparatus 4000 (the apparatus 4000 may be specifically a computer device) shown in FIG. 26 includes a memory 4001, a processor 4002, a communications interface 4003, and a bus 4004. Communication connections between the memory 4001, the processor 4002, and the communications interface 4003 are implemented through the bus 4004.

The memory 4001 may be a read-only memory (read-only memory, ROM), a static storage device, a dynamic storage device, or a random access memory (random access memory, RAM). The memory 4001 may store a program. When the program stored in the memory 4001 is executed by the processor 4002, the processor 4002 is configured to perform the steps of the pedestrian detection method in the embodiments of this application.

The processor 4002 may use a general-purpose central processing unit (central processing unit, CPU), a microprocessor, an application-specific integrated circuit (application specific integrated circuit, ASIC), a graphics processing unit (graphics processing unit, GPU), or one or more integrated circuits, and is configured to execute a related program, to implement the pedestrian detection method in the method embodiments of this application.

The processor 4002 may alternatively be an integrated circuit chip and has a signal processing capability. In an implementation process, the steps of the pedestrian detection method of this application can be implemented by using a hardware integrated logical circuit in the processor 4002, or by using an instruction in a form of software.

The processor 4002 may alternatively be a general-purpose processor, a digital signal processor (digital signal processing, DSP), an application-specific integrated circuit (ASIC), a field programmable gate array (field programmable gate array, FPGA) or another programmable logical device, a discrete gate or transistor logic device, or a discrete hardware component. The methods, the steps, and the logical block diagrams that are disclosed in the embodiments of this application may be implemented or performed. The general-purpose processor may be a microprocessor, or the processor may be any conventional processor or the like. Steps of the methods disclosed with reference to the embodiments of this application may be directly executed and completed by using a hardware decoding processor, or may be executed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 4001. The processor 4002 reads information in the memory 4001, and completes, in combination with hardware of the processor 4002, functions that need to be performed by units included in the pedestrian detection apparatus, or performs the pedestrian detection method in the method embodiments of this application.

The communications interface 4003 uses a transceiver apparatus, for example, but not limited to, a transceiver, to implement communication between the apparatus 4000 and another device or a communications network. For example, a to-be-processed image may be obtained by using the communications interface 4003.

The bus 4004 may include a path for information transfer between various components (for example, the memory 4001, the processor 4002, and the communications interface 4003) of the apparatus 4000.

Figure 27:
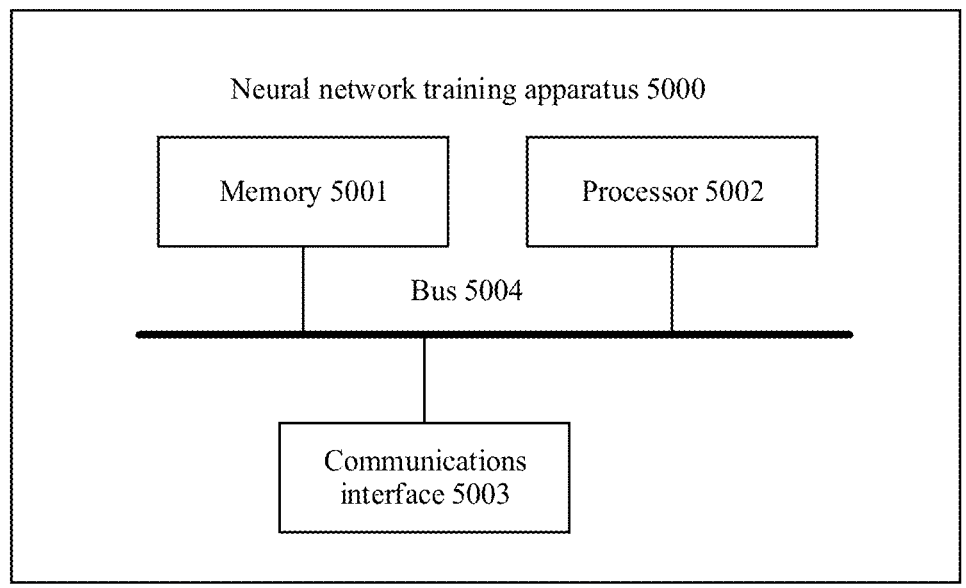
FIG. 27 is a schematic diagram of a hardware structure of a neural network training apparatus according to an embodiment of this application.

FIG. 27 is a schematic diagram of a hardware structure of a neural network training apparatus according to an embodiment of this application. Similar to the foregoing apparatus 4000, the neural network training apparatus 5000 shown in FIG. 27 includes a memory 5001, a processor 5002, a communications interface 5003, and a bus 5004. Communication connections between the memory 5001, the processor 5002, and the communications interface 5003 are implemented through the bus 5004.

The memory 5001 may be a ROM, a static storage device, or a RAM. The memory 5001 may store a program. When the program stored in the memory 5001 is executed by the processor 5002, the processor 5002 and the communications interface 5003 are configured to perform steps of the neural network training method in the embodiments of this application.

The processor 5002 may use a general-purpose CPU, a microprocessor, an ASIC, a GPU, or one or more integrated circuits, and is configured to execute a related program, to implement functions that need to be performed by units in the image processing apparatus in the embodiments of this application, or perform the neural network training method in the method embodiments of this application.

The processor 5002 may alternatively be an integrated circuit chip and has a signal processing capability. In an implementation process, steps in the neural network training method in the embodiments of this application can be implemented by using a hardware integrated logical circuit in the processor 5002, or by using an instruction in a form of software.

The foregoing processor 5002 may alternatively be a general-purpose processor, a DSP, an ASIC, an FPGA or another programmable logical device, a discrete gate or transistor logic device, or a discrete hardware component. The methods, the steps, and the logical block diagrams that are disclosed in the embodiments of this application may be implemented or performed. The general-purpose processor may be a microprocessor, or the processor may be any conventional processor or the like. Steps of the methods disclosed with reference to the embodiments of this application may be directly executed and completed by using a hardware decoding processor, or may be executed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 5001. The processor 5002 reads information in the memory 5001, and completes, in combination with hardware of the processor 5002, functions that need to be performed by units included in the image processing apparatus in the embodiments of this application, or performs the neural network training method in the method embodiment of this application.

The communications interface 5003 uses a transceiver apparatus, for example, but not limited to, a transceiver, to implement communication between the apparatus 5000 and another device or a communications network. For example, a to-be-processed image may be obtained by using the communications interface 5003.

The bus 5004 may include a path for information transfer between various components (for example, the memory 5001, the processor 5002, and the communications interface 5003) of the apparatus 5000.

It should be noted that, although only the memory, the processor, and the communications interface are shown in each of the apparatus 4000 and the apparatus 5000, in a specific implementation process, a person skilled in the art should understand that the apparatus 4000 and the apparatus 5000 each may further include another component necessary for normal running. In addition, according to a specific requirement, a person skilled in the art should understand that the apparatus 4000 and the apparatus 5000 may further include hardware components for implementing other additional functions. In addition, a person skilled in the art should understand that the apparatus 4000 and the apparatus 5000 may include only components necessary for implementing the embodiments of this application, but not necessarily include all the components shown in FIG. 26 and FIG. 27.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A pedestrian detection method, comprising:
obtaining an image;
performing feature extraction on the image to obtain a basic feature map of the image;
determining, based on the basic feature map of the image, a proposal of the image, wherein the proposal of the image is a bounding box of a region comprising a pedestrian in the image;
processing the basic feature map of the image to obtain an object visibility map of the image, wherein a pixel value of a pedestrian visible part in the object visibility map of the image is greater than a pixel value of a pedestrian invisible part in the object visibility map of the image;
performing fusion processing on the basic feature map of the image and the object visibility map of the image to obtain an enhanced feature map of the image;
determining, based on the proposal of the image and the enhanced feature map of the image, a feature corresponding to the proposal of the image, wherein the feature corresponding to the proposal of the image comprises a region feature of the proposal of the image, and the region feature of the proposal of the image is a feature of a region that is in the enhanced feature map and that is located in the proposal of the image; and
determining, based on the feature corresponding to the proposal of the image, the bounding box comprising the pedestrian in the image and a confidence level of the bounding box comprising the pedestrian in the image.

2. The method according to claim 1, wherein the pedestrian invisible part in the object visibility map of the image comprises a pedestrian blocked part.

3. The method according to claim 1, wherein the pedestrian invisible part in the object visibility map of the image comprises a background part of the image.

4. The method according to claim 1, wherein:
processing the basic feature map of the image to obtain the object visibility map of the image comprises:
performing, by using a first convolutional network, convolution processing on the basic feature map of the image to obtain a plurality of first semantic feature maps, wherein the plurality of first semantic feature maps are a plurality of feature maps that have different semantic meanings and that are extracted from a full map of the basic feature map; and
performing weighted summation processing on the plurality of first semantic feature maps to obtain the object visibility map of the image; and
determining, based on the feature corresponding to the proposal of the image, the bounding box comprising the pedestrian in the image and the confidence level of the bounding box comprising the pedestrian in the image comprises:
performing, by using a second convolutional network, convolution processing on the feature corresponding to the proposal of the image, to obtain a plurality of second semantic feature maps, wherein the plurality of second semantic feature maps represent, respectively, a plurality of feature maps that have different semantic meanings and that are extracted from the feature corresponding to the proposal of the image, and wherein a convolution parameter of the second convolutional network is the same as a convolution parameter of the first convolutional network;
processing, by using a regressor, a plurality of second semantic features to determine a location of the bounding box; and
processing, by using a classifier, the plurality of second semantic features to obtain the confidence level of the bounding box comprising the pedestrian in the image, wherein a weighting coefficient used when the weighted summation processing is performed on a plurality of first semantic features is a weight coefficient that is in the classifier and that is used to determine a pedestrian score.

5. The method according to claim 1, wherein the feature corresponding to the proposal of the image further comprises a region feature of a contour region of the proposal of the image, and wherein the contour region of the proposal of the image is a region formed between the proposal of the image and a scaled-down proposal obtained after the proposal of the image is scaled down by a first preset proportion.

6. The method according to claim 5, wherein the method further comprises:
setting a value of a feature that is of the region feature of the proposal of the image and that is located in the scaled-down proposal to zero, to obtain the region feature of the contour region of the proposal of the image.

7. The method according to claim 1, wherein the feature corresponding to the proposal of the image further comprises a region feature of a background region of the proposal of the image, and the background region of the proposal of the image is a region formed between the proposal of the image and a scaled-up proposal obtained after the proposal of the image is scaled up by a second preset proportion.

8. The method according to claim 7, wherein the method further comprises:
obtaining a region feature of a first region, wherein the region feature of the first region is a region feature in a region that is in the object visibility map of the image and that is located in the scaled-up proposal; and
setting a value of a feature that is of the region feature of the first region and that is located in the proposal of the image to zero, to obtain the region feature of the background region of the proposal of the image.

9. The method according to claim 1, wherein performing feature extraction on the image to obtain the basic feature map of the image comprises:

performing convolution processing on the image to obtain the basic feature map of the image.

10. A pedestrian detection apparatus, comprising
at least one processor; and
one or more memories coupled to the at least one processor, wherein one or more memories store programming instructions for execution by the at least one processor to cause the apparatus to:
obtain an image;
perform feature extraction on the image to obtain a basic feature map of the image;
determine, based on the basic feature map of the image, a proposal of the image, wherein the proposal of the image is a bounding box of a region comprising a pedestrian in the image;
process the basic feature map of the image to obtain an object visibility map of the image, wherein a pixel value of a pedestrian visible part in the object visibility map of the image is greater than a pixel value of a pedestrian invisible part in the object visibility map of the image;
perform fusion processing on the basic feature map of the image and the object visibility map of the image to obtain an enhanced feature map of the image;
determine, based on the proposal of the image and the enhanced feature map of the image, a feature corresponding to the proposal of the image, wherein the feature corresponding to the proposal of the image comprises a region feature of the proposal of the image, and the region feature of the proposal of the image is a feature of a region that is in the enhanced feature map and that is located in the proposal of the image; and
determine, based on the feature corresponding to the proposal of the image, the bounding box comprising the pedestrian in the image and a confidence level of the bounding box comprising the pedestrian in the image.

11. The apparatus according to claim 10, wherein the pedestrian invisible part in the object visibility map of the image comprises a pedestrian blocked part.

12. The apparatus according to claim 10, wherein the pedestrian invisible part in the object visibility map of the image comprises a background part of the image.

13. The apparatus according to claim 10, wherein:
the programming instructions, when executed by the at least one processor, cause the apparatus to:
perform, by using a first convolutional network, convolution processing on the basic feature map of the image to obtain a plurality of first semantic feature maps, wherein the plurality of first semantic feature maps are a plurality of feature maps that have different semantic meanings and that are extracted from a full map of the basic feature map; and
perform weighted summation processing on the plurality of first semantic feature maps to obtain the object visibility map of the image; and
determining, based on the feature corresponding to the proposal of the image, the bounding box comprising the pedestrian in the image and the confidence level of the bounding box comprising the pedestrian in the image comprises:
performing, by using a second convolutional network, convolution processing on the feature corresponding to the proposal of the image, to obtain a plurality of second semantic feature maps, wherein the plurality of second semantic feature maps represent, respectively, a plurality of feature maps that have different semantic meanings and that are extracted from the feature corresponding to the proposal of the image, and wherein a convolution parameter of the second convolutional network is the same as a convolution parameter of the first convolutional network;
processing, by using a regressor, a plurality of second semantic features to determine a location of the bounding box; and
processing, by using a classifier, the plurality of second semantic features to obtain the confidence level of the bounding box comprising the pedestrian in the image, wherein a weighting coefficient used when the weighted summation processing is performed on a plurality of first semantic features is a weight coefficient that is in the classifier and that is used to determine a pedestrian score.

14. The apparatus according to claim 10, wherein the feature corresponding to the proposal of the image further comprises a region feature of a contour region of the proposal of the image, and wherein the contour region of the proposal of the image is a region formed between the proposal of the image and a scaled-down proposal obtained after the proposal of the image is scaled down by a first preset proportion.

15. The apparatus according to claim 14, wherein the programming instructions, when executed by the at least one processor, cause the apparatus to set a value of a feature that is of the region feature of the proposal of the image and that is located in the scaled-down proposal to zero, to obtain the region feature of the contour region of the proposal of the image.

16. The apparatus according to claim 10, wherein the feature corresponding to the proposal of the image further comprises a region feature of a background region of the proposal of the image, and the background region of the proposal of the image is a region formed between the proposal of the image and a scaled-up proposal obtained after the proposal of the image is scaled up by a second preset proportion.

17. The apparatus according to claim 16, wherein the programming instructions, when executed by the at least one processor, cause the apparatus to:
obtain a region feature of a first region, wherein the region feature of the first region is a region feature in a region that is in the object visibility map of the image and that is located in the scaled-up proposal; and
set a value of a feature that is of the region feature of the first region and that is located in the proposal of the image to zero, to obtain the region feature of the background region of the proposal of the image.

18. The apparatus according to claim 10, wherein the programming instructions, when executed by the at least one processor, cause the apparatus to perform convolution processing on the image to obtain the basic feature map of the image.

19. A non-transitory computer-readable storage medium storing one or more instructions executable by at least one processor to perform operations comprising:
obtaining an image;
performing feature extraction on the image to obtain a basic feature map of the image;
determining, based on the basic feature map of the image, a proposal of the image, wherein the proposal of the image is a bounding box of a region comprising a pedestrian in the image;

processing the basic feature map of the image to obtain an object visibility map of the image, wherein a pixel value of a pedestrian visible part in the object visibility map of the image is greater than a pixel value of a pedestrian invisible part in the object visibility map of the image;

performing fusion processing on the basic feature map of the image and the object visibility map of the image to obtain an enhanced feature map of the image;

determining, based on the proposal of the image and the enhanced feature map of the image, a feature corresponding to the proposal of the image, wherein the feature corresponding to the proposal of the image comprises a region feature of the proposal of the image, and the region feature of the proposal of the image is a feature of a region that is in the enhanced feature map and that is located in the proposal of the image; and determining, based on the feature corresponding to the proposal of the image, a bounding box comprising the pedestrian in the image and a confidence level of the bounding box comprising the pedestrian in the image.

20. A chip, wherein the chip comprises at least one processor and a data interface, wherein the at least one processor, by reading through the data interface, perform operations, when executed, based on instructions stored in a non-transitory memory, the operation including:

obtaining an image;

performing feature extraction on the image to obtain a basic feature map of the image;

determining, based on the basic feature map of the image, a proposal of the image, wherein the proposal of the image is a bounding box of a region comprising a pedestrian in the image;

processing the basic feature map of the image to obtain an object visibility map of the image, wherein a pixel value of a pedestrian visible part in the object visibility map of the image is greater than a pixel value of a pedestrian invisible part in the object visibility map of the image;

performing fusion processing on the basic feature map of the image and the object visibility map of the image to obtain an enhanced feature map of the image;

determining, based on the proposal of the image and the enhanced feature map of the image, a feature corresponding to the proposal of the image, wherein the feature corresponding to the proposal of the image comprises a region feature of the proposal of the image, and the region feature of the proposal of the image is a feature of a region that is in the enhanced feature map and that is located in the proposal of the image; and determining, based on the feature corresponding to the proposal of the image, a bounding box comprising the pedestrian in the image and a confidence level of the bounding box comprising the pedestrian in the image.

* * * * *